June 3, 1930. W. E. WILLIAMS 1,761,283
COPY MACHINE USING THE HECTOGRAPH METHOD
Filed May 10, 1926 12 Sheets-Sheet 4

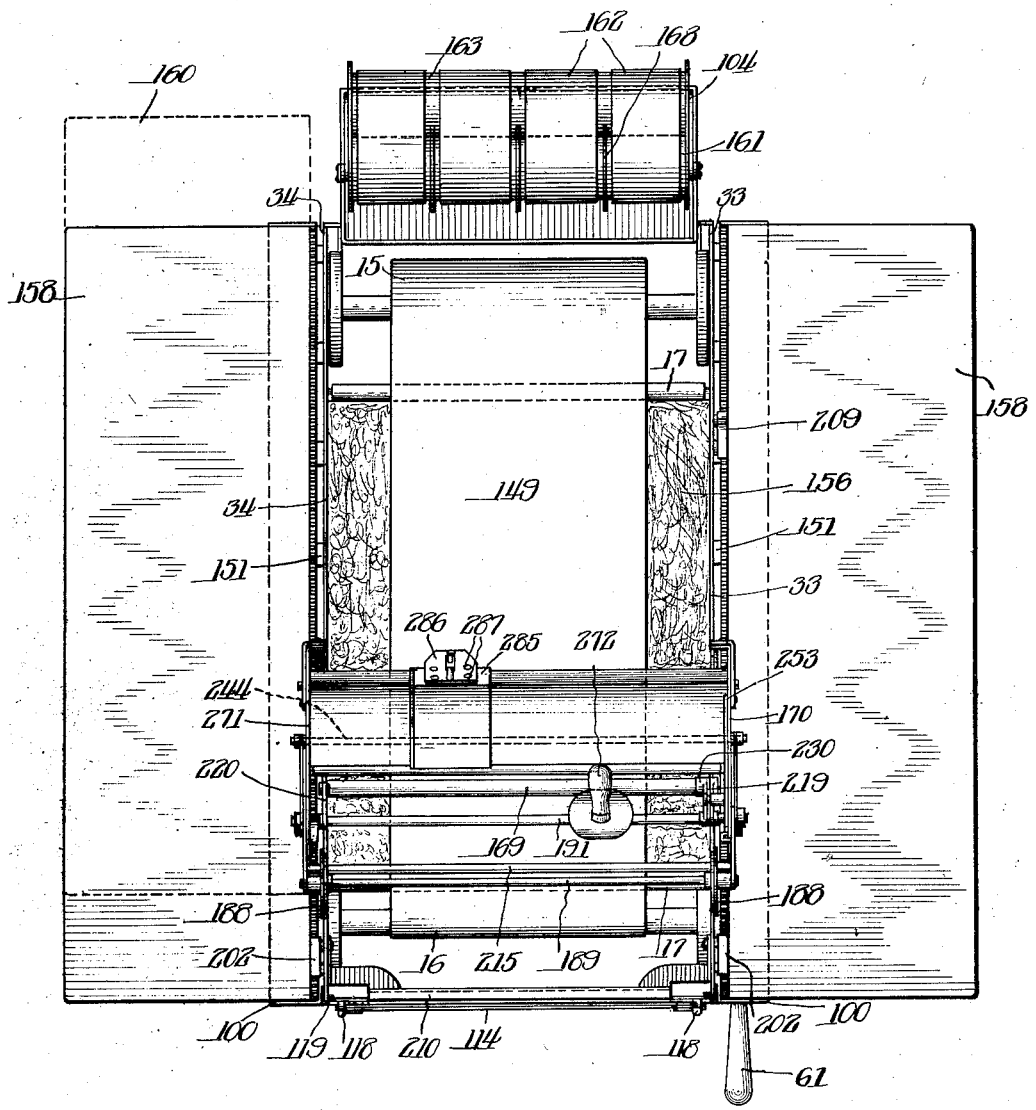

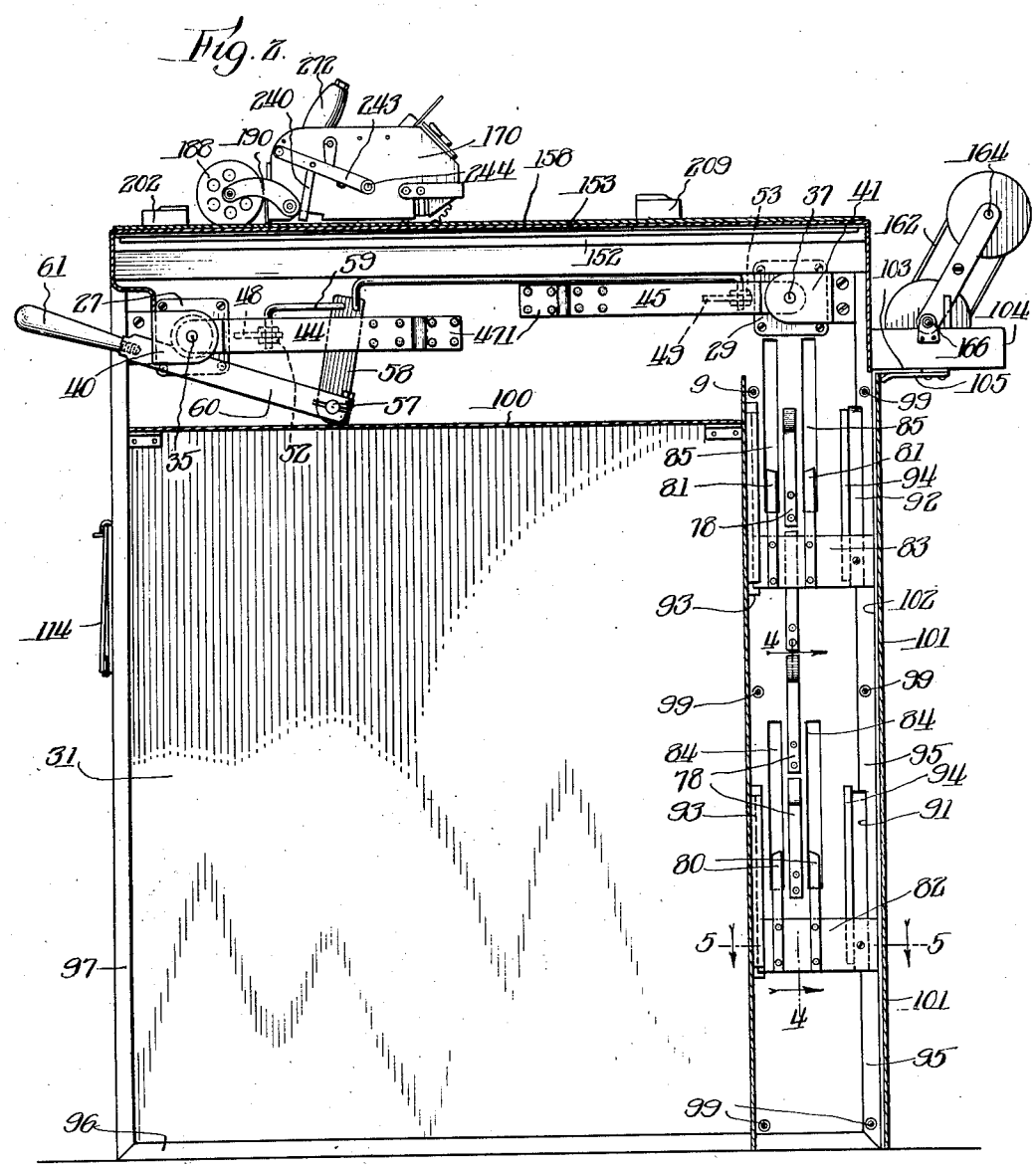

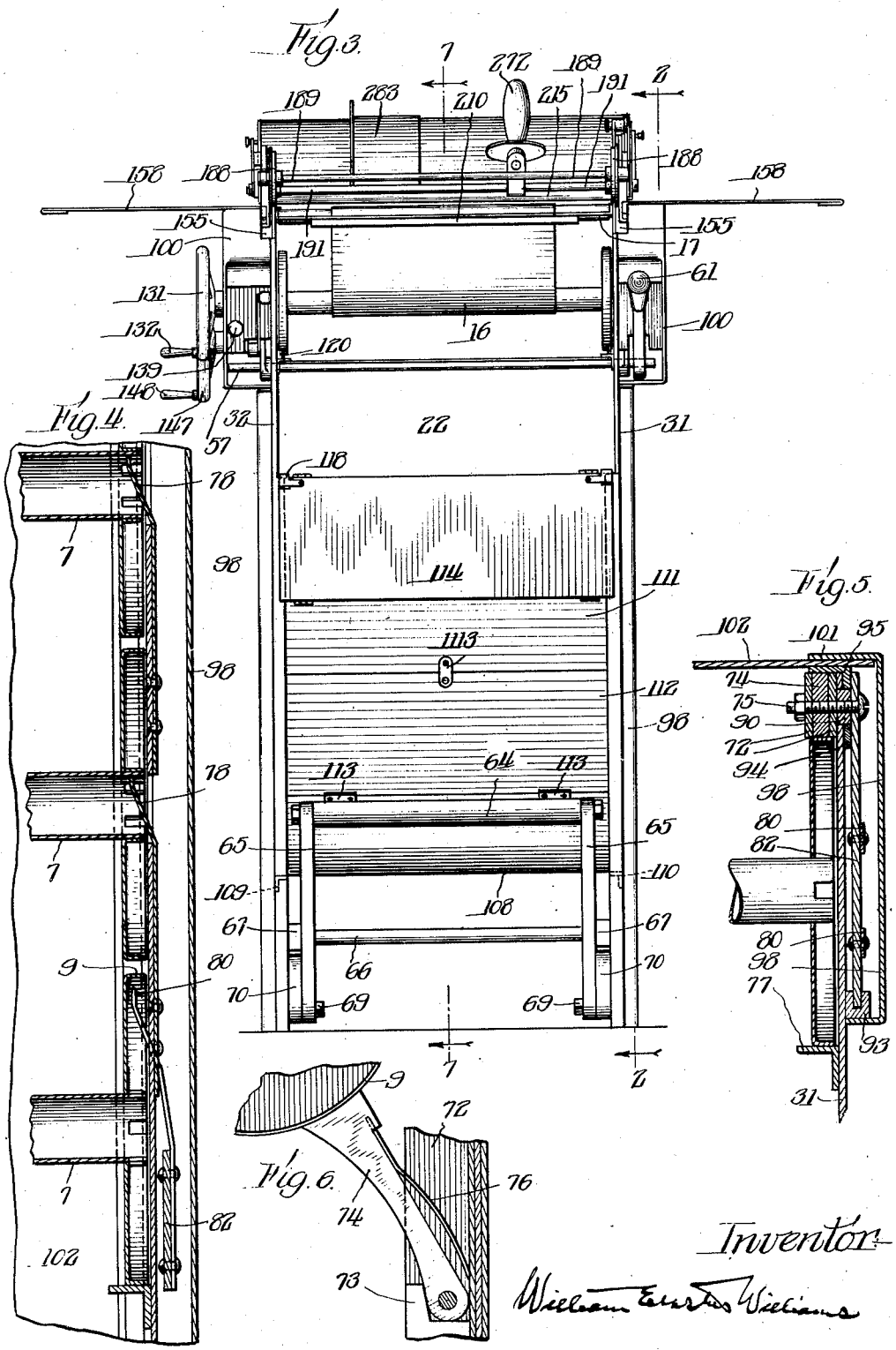

Inventor
William Erastus Williams

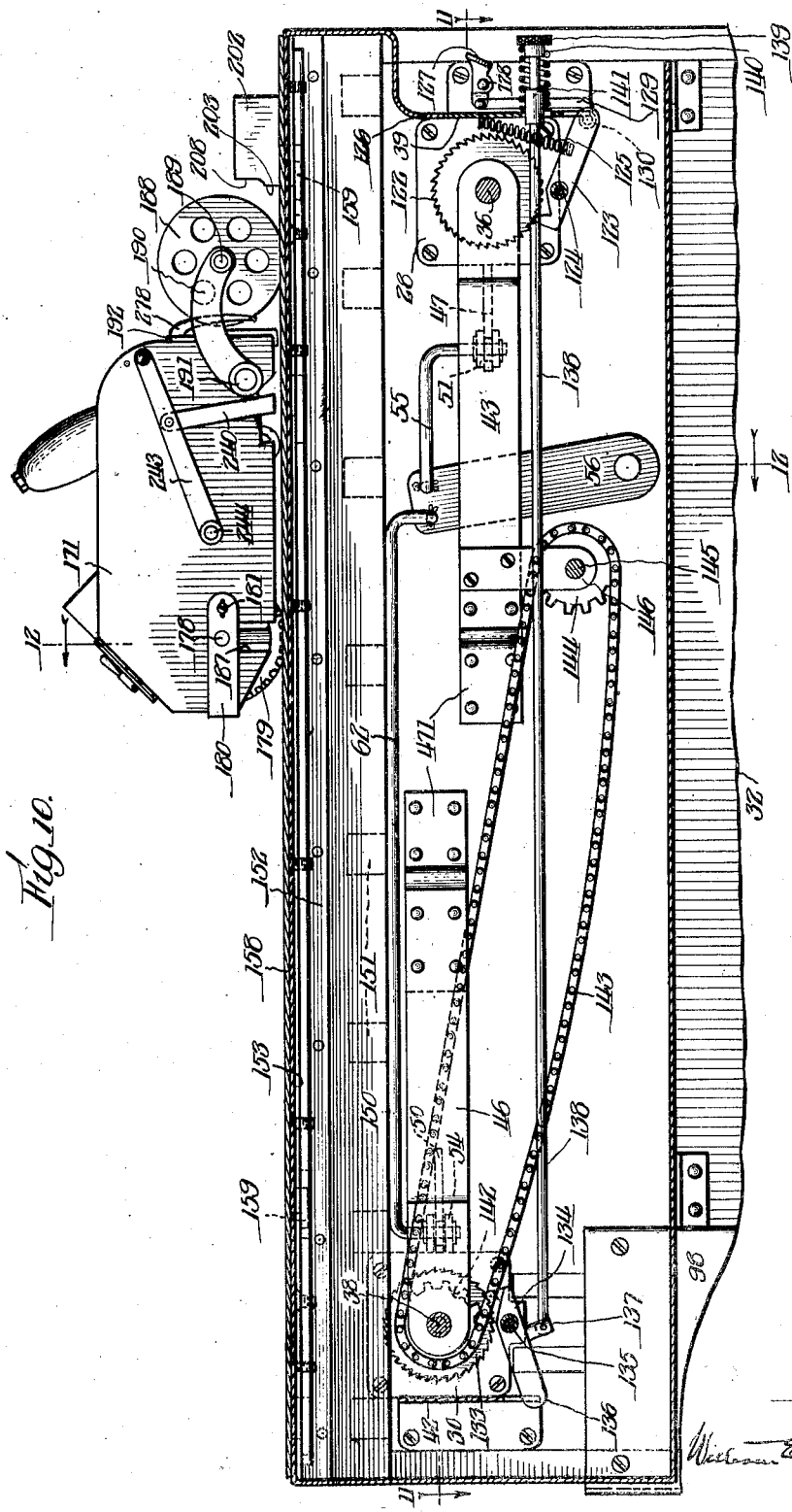

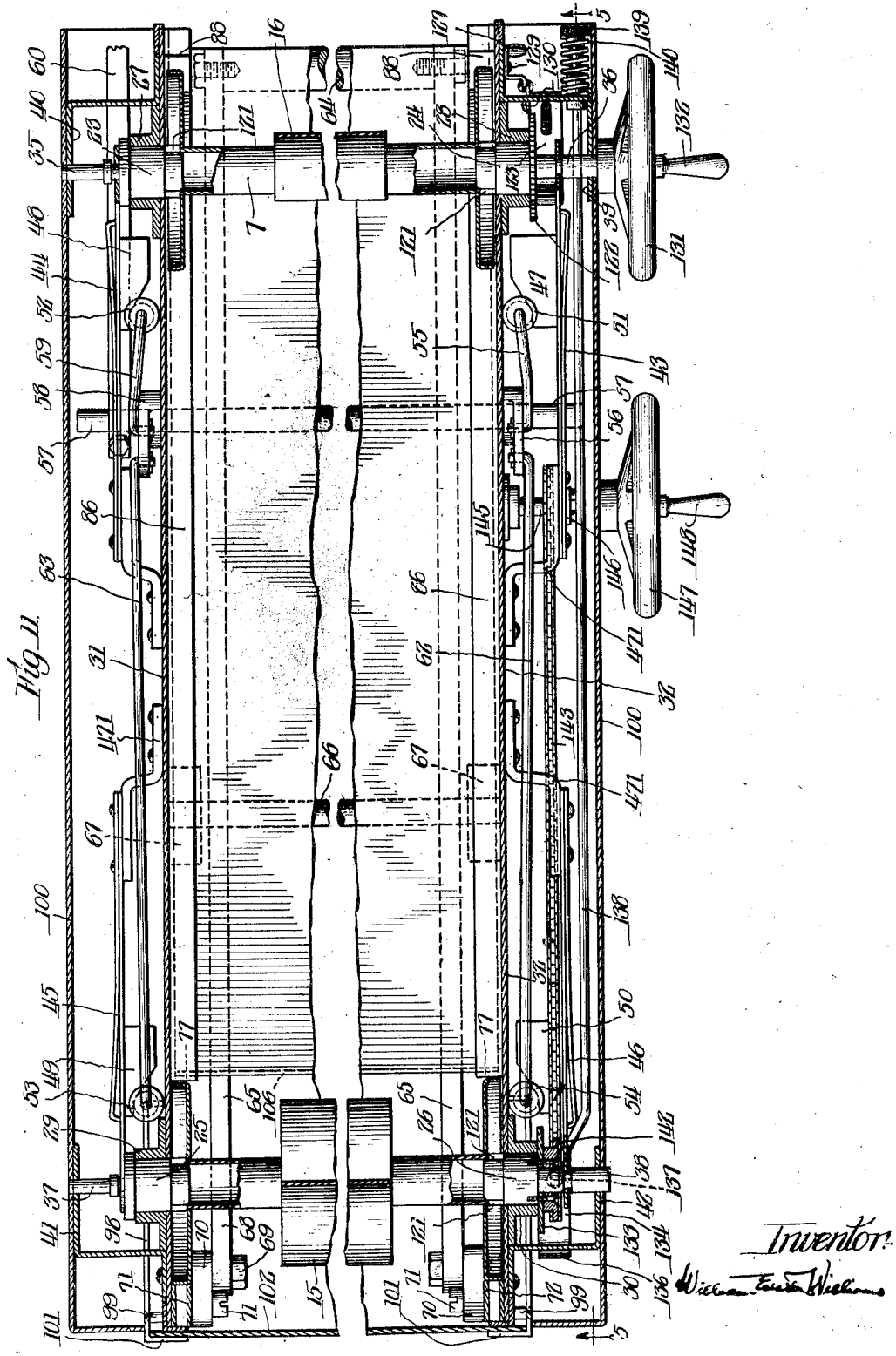

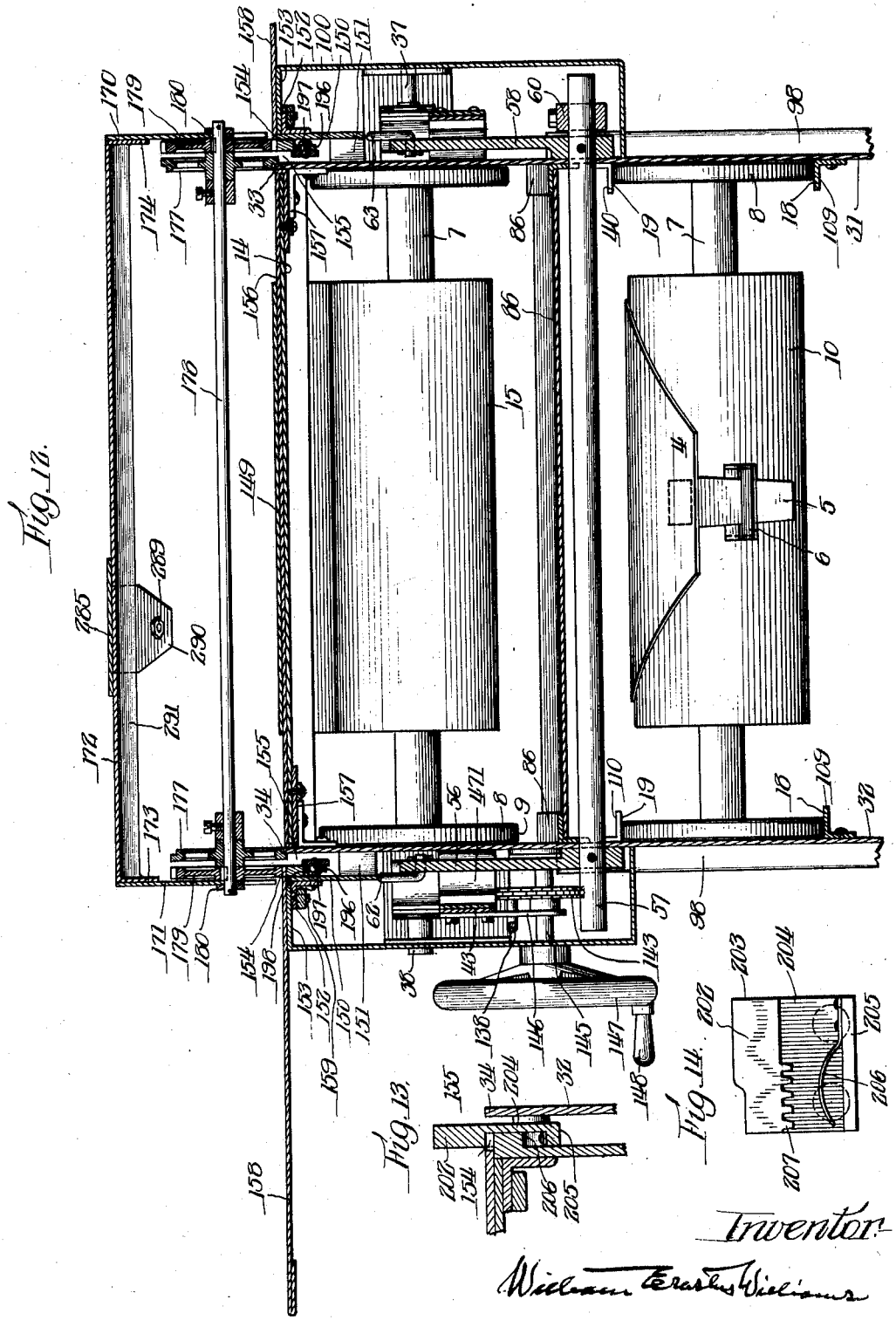

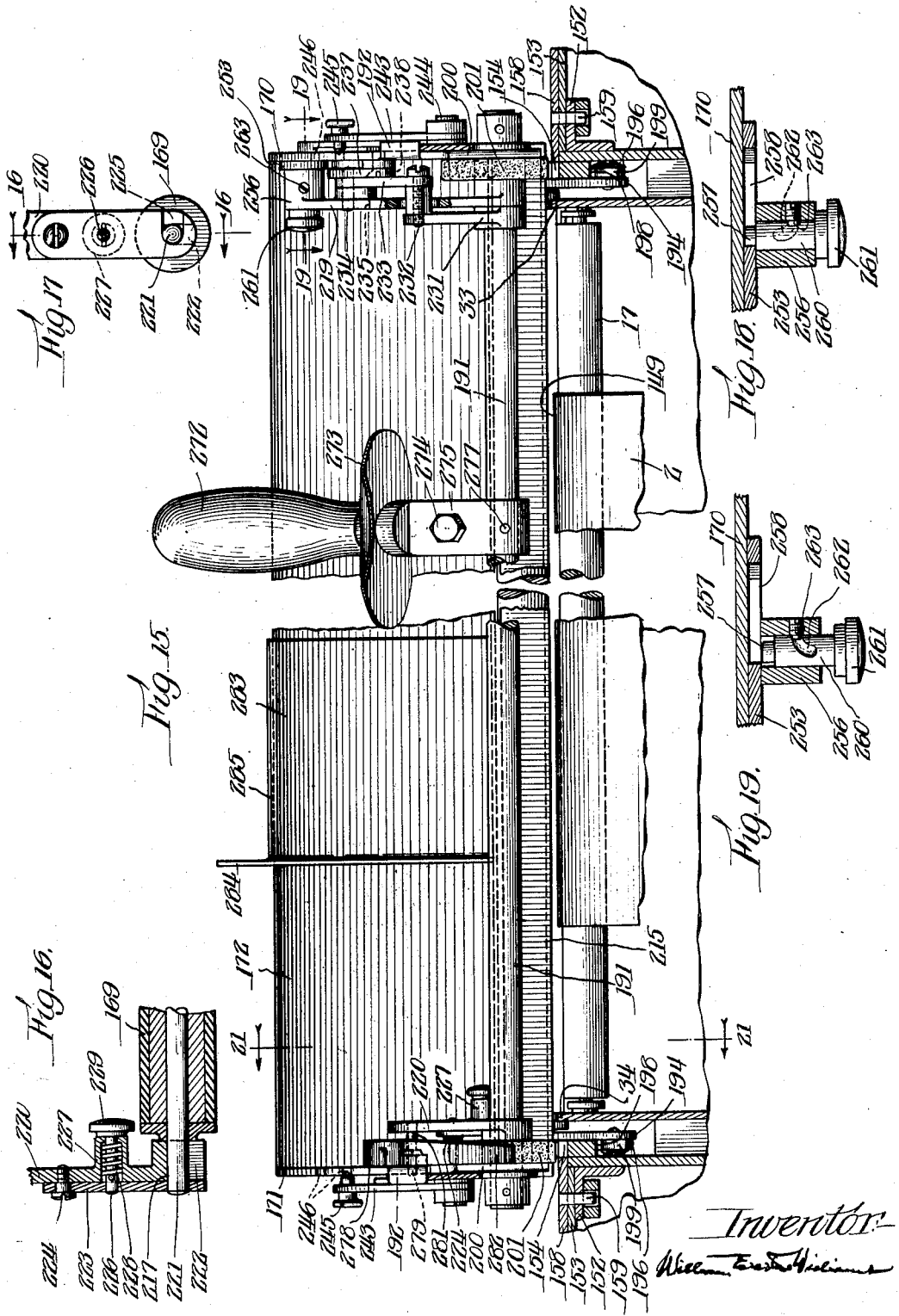

June 3, 1930.  W. E. WILLIAMS  1,761,283
COPY MACHINE USING THE HECTOGRAPH METHOD
Filed May 10, 1926  12 Sheets-Sheet 9

Inventor
William Erastus Williams

June 3, 1930.  W. E. WILLIAMS  1,761,283
COPY MACHINE USING THE HECTOGRAPH METHOD
Filed May 10, 1926    12 Sheets-Sheet 11

Inventor
William Everettus Williams

June 3, 1930.  W. E. WILLIAMS  1,761,283
COPY MACHINE USING THE HECTOGRAPH METHOD
Filed May 10, 1926  12 Sheets-Sheet 12
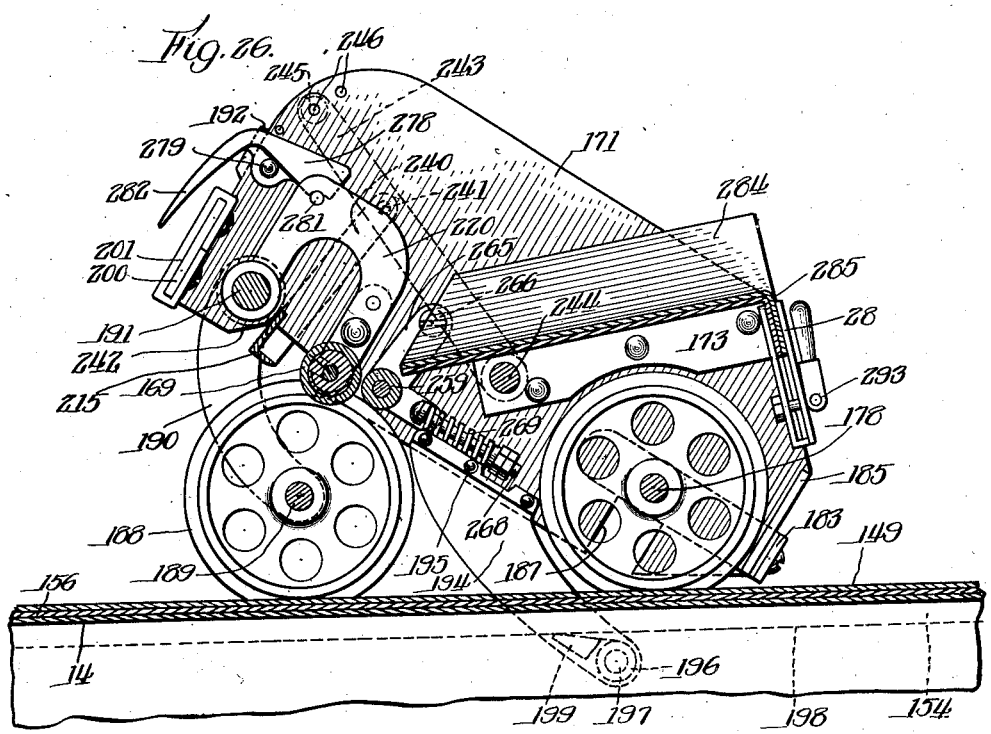
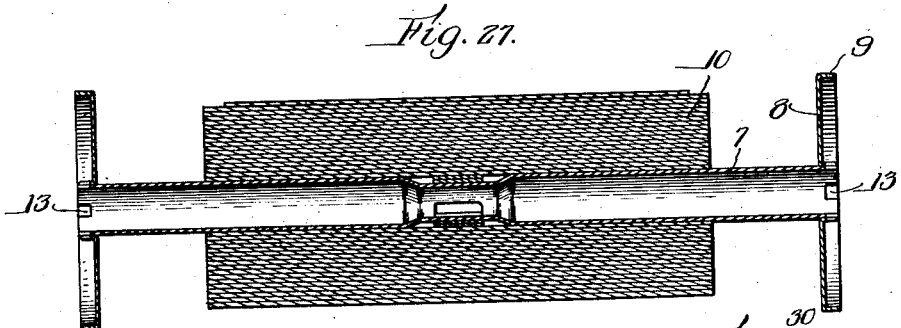
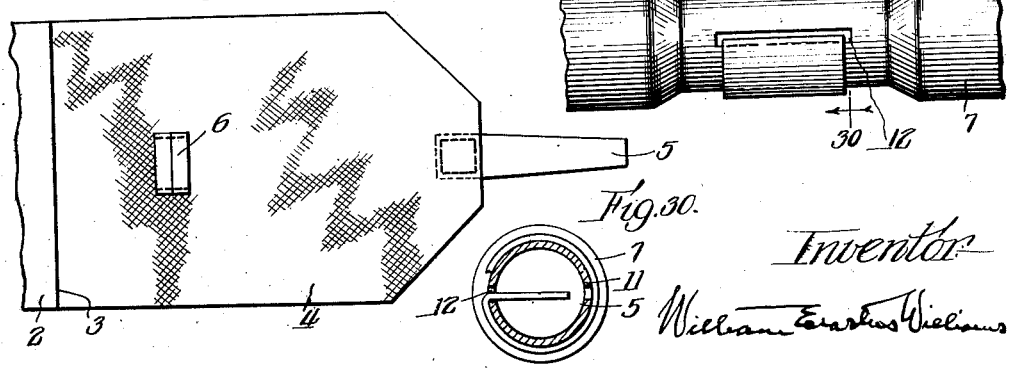

Patented June 3, 1930

1,761,283

UNITED STATES PATENT OFFICE

WILLIAM ERASTUS WILLIAMS, OF WILMETTE, ILLINOIS, ASSIGNOR TO DITTO, INCORPORATED, OF CHICAGO, ILLINOIS, A CORPORATION OF WEST VIRGINIA

COPY MACHINE USING THE HECTOGRAPH METHOD

Application filed May 10, 1926. Serial No. 108,058.

My invention relates to a machine which uses rolls of sheets of paper or fabric, upon which there is a coating of gelatin adapted to do copy work, by what is known as the hectograph method, and the invention relates to the method of holding spindles, upon which these rolls are wound, in a magazine and delivering and holding them in position to have the gelatinized surface moistened automatically and to have the gelatinized sheet trained over an impression bed in combination with a movable carriage that applies the copy to the gelatinized sheet on the impression bed.

The object of the invention is to provide a conveniently arranged storage for a series of rolls of gelatinized fabric and mechanically deliver these rolls in the position in the machine in relation to an impression bed. The sheet of gelatinized material being unwound from one roll onto a spindle at the other end of the machine and passing over the impression bed in the transit at intervals as each section of the gelatinized sheet is used and to provide an impression carriage having special detailed merits for convenience of construction, ease of operation, and accuracy of work and at the same time provide in one machine what is known as the marginless margin bar and an ordinary margin bar as heretofore used with some types of these machines. In general terms the object of the invention is to provide a highly efficient easily operated, handy machine in which is combined storage facilities for the large supply of gelatin rolls and at the same time combine in one machine what is termed a marginless and an ordinary margin bar machine as largely used in the hectograph copying work the especially meritorious details of which will be further pointed out in the specification and claims.

In general terms the machine comprises as basis of the mechanism an impression bed and a movable carriage adapted to be moved to and fro over the said bed in making the copies and holding means for the roll spindles on each end of the bed adapted and arranged for winding off from one spindle the gelatinized sheet over the bed to another roll spindle upon which the sheet is rewound and a moistening device and a magazine for carrying a series of rolls successively brought into service in relation to the impression bed.

Reference will be had to the accompanying drawing in which Fig. 1 is a plan view of the complete machine in a position of operation.

Fig. 2 is an elevation of the right side of the machine with the outside guards broken away exposing the mechanism underneath the guards on line 2—2 of Fig. 3.

Fig. 3 is an end elevation of the machine looking at the end whereat the operator sits or stands being the left side of Fig. 2 and the lower side of Fig. 1.

Fig. 4 is a sectional elevation on a larger scale on line 4—4 of Fig. 2 showing part of the elevating mechanism which moves up roll spindles from the bottom of the roll magazine.

Fig. 5 is a section on line 5—5 of Fig. 2 showing a part of the roll elevating mechanism at that section.

Fig. 6 is an elevational detail on a somewhat enlarged scale of one of the elevating dogs that assist in lifting the roll spindles from the bottom of the magazine upward to the position at the right end of the impression bed.

Fig. 8 is a section through the closure gate for the front end of the machine or the left end of Fig. 7, the closure gate in Fig. 7 being shown open while in Fig. 8 the position is that of a gate being closed.

Fig. 10 is an elevational view of the left side of the machine corresponding to the left side of Fig. 1 showing the top portion only of the machine, cover or guard plate being in section exposing the mechanism on the outside of the main frame of the machine.

Fig. 11 is a plan section of the machine on line 11—11 of Fig. 10.

Fig. 12 is a transverse elevational view looking from the front or the operator's side of the machine showing the upper portion of the machine on line 12—12 of Fig. 10.

Fig. 13 is a transverse elevational view of the corner of the framework of the machine on line 13—13 of Fig. 20.

Fig. 14 is a side elevational view of one of the adjustable stop blocks of the carriage.

Fig. 15 is a vertical sectional elevational view through the impression bed or plateau on line 15—15 of Fig. 20.

Fig. 16 is an elevational sectional view of the detachable means for the impression roller in the carriage frame on line 16—16 of Fig. 17.

Fig. 17 is a view of the part of the machine shown in Fig. 16, looking from the left of Fig. 16.

Fig. 18 is a plan sectional detail on line 19—19 of Fig. 15 showing a detail of the carriage construction.

Fig. 19 is a similar view to that of Fig. 18 with the parts in a detached position.

Fig. 25 is a similar view to that of Fig. 24 the latter figure being that after the paper has been placed as shown in Fig. 25 showing the commencement of the evolution of the machine and Fig. 24 is the first step in the evolution or act of impressing the paper to the gelatin pad on the impression bed when the ordinary margin bar is used.

Fig. 26 is a transverse sectional view through the impression carriage and part of the impression bed looking in the same direction as shown in Figs. 20 and 21 being from the right side of the machine showing the position of the carriage but when set for clearance purposes for the admission of the end of the gelatin pad strip in the act of training the same over the impression bed.

Fig. 27 is a sectional elevation of one of the gelatin rolls mounted upon a spindle.

Fig. 28 is a plan of the end of one of the gelatin pad sheets when it is free from its carrying spindle.

Fig. 29 is a large elevational detail of the central part of the carrying spindle shown in Fig. 27.

Fig. 30 is a detail section on line 30—30 of Fig. 29.

Figure 7:
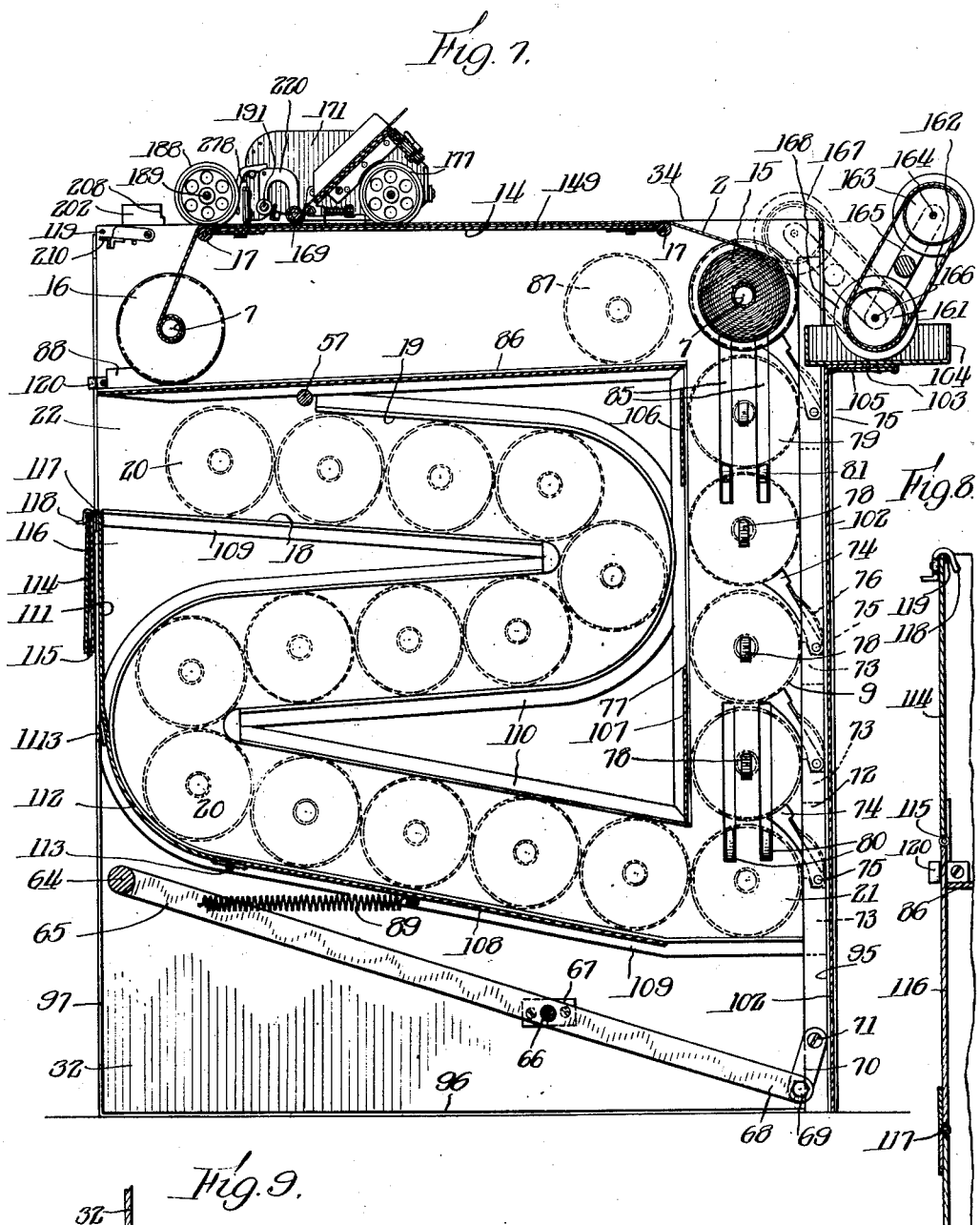
Fig. 7 is a sectional elevation of the machine on line 7—7 of Fig. 3 which is through the body of the machine and looking in the same direction as that of Fig. 2.
Figure 9:
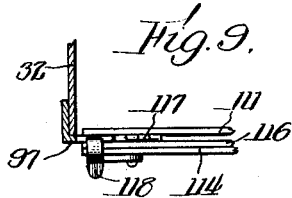
Fig. 9 is a plan detail showing the fastening of this closure gate when the gate is in the open position as shown in Fig. 7.

The gelatin pad sheet or hectograph sheet is a strip of paper or fabric having a gelatinized surface or hectograph surface which is indicated as 2 in Fig. 28. On each end of this sheet 2 there is secured at 3 a cover or enwrapping end of cloth or other protective material 4 properly termed a wrapper but used only as a preference as the gelatin pad itself may become its own end or wrapper and various means of holding this hectograph strip 2 upon spindles may be employed but I prefer to furnish the end 4 with a strap piece 5 which when wrapped around the end of the roll wound upon the spindle may be secured in place by being tucked into the keeper strap 6 somewhat after the manner of a pocket book or bill fold having an outside enwrapping strap similar to the strap 5. For supporting and carrying my gelatin pad or hectograph pad sheet I prefer to use a spindle spool made of metal or any suitable material but here shown as having a tubular spindle 7 see Fig. 27 on the end of which are metallic flanges 8 having the tread portions 9, the tread portions 9 always being larger than the diameter of the completed wound up roll 10 as shown in Fig. 27.

In the center of the tubular spindle 7 of my hectograph carrying spools I reduce the body portion of the tube in diameter as indicated by 11 see Fig. 29 and in this reduced diameter portion there are apertures 12 into which the strap end 5 is tucked in winding on the end of the hectograph roll 2. The reduced portion 11 is provided to accommodate for the strap 5 thus avoiding a bulge in the roll of the hectograph sheet on the tubular spindle 7. At the ends of the tubular spindle 7 there are notches 13 see Fig. 27 which are engaged by little projections in the machine for rotating the spindle and for holding it in a fixed position as will be understood later.

The machine is composed primarily of a bed plate, or impression bed 14 see Fig. 7 over which the gelatin pad sheet 2 is strained and from which are taken the impressions on that portion 149 of the sheet 2 which lies on the bed 14. The gelatin pad sheet 2 is strained from the spindle position 15 over the bed 14 and wound upon a spindle at the spindle position 16 at the front or operator's end of the machine. This arrangement of the impression bed and the location of the spindles for carrying the hectograph sheet in general terms is the common procedure heretofore used.

The ends of the impression bed are provided with antifriction rollers 17 to facilitate the carrying of the hectograph sheet 2 over the ends of the impression bed 14. The surplus spindles of hectograph sheet are carried in a chuteway S-shaped as here shown in the lower base or body portion of the machine and this chuteway is provided with rails 18 and 19 between which the spindles 20 roll down by gravity to the bottom end of this chuteway where the lowermost roll is indicated by 21. Mechanism is provided for elevating consecutively the hectograph spools from the position of 21 upward step by step to the service position 15 where the hectograph sheet is taken and trained over the impression bed 14. When a roll has been used wound successively from the spindle position 15 to 16, the latter then becomes the loaded spindle and it is taken out and reversed end for end and put into the entrance of the chuteway indicated by 22.

As a fresh roll is delivered up to the position 15 the used roll is deposited in the chuteway at the entrance 22 thus one by one the rolls travel behind each other, as it were, around and around to be serviced at the impression bed 14.

The S-chuteway may be termed a magazine for carrying the extra rolls and as it occupies the body portion of the framework of the machine it takes up little or no added floor space from the normal space occupied by the impression or copying bed of the machine. The hectograph methods of making copies is such that a roll upon which a copy is impressed and taken from one day, when allowed to rest to the next day, the ink used is of such a character that it becomes diffused into the gelatin surface so that any given roll may be used approximately once a day, as it were, and thus I provide capacity in my chuteway for storing a sufficient number of rolls to accommodate for a full day's active operation of copying in one of these machines as normally used in a service which amounts to a maximum efficiency of this class of copying.

The mechanism for holding the hectograph spindles or spools and servicing the same in the positions of 15 and 16 as shown in Fig. 7 is best understood by the reference to Figs. 2, 11 and 12.

The open ends of the tubular spindle portion 7 of the spools are engaged by spindle holding means having the ends of shaft or spindle plugs 23, 24, 25, 26 which plugs are held in bearing castings 27, 28, 29, and 30 see Fig. 11. These castings are secured by rivets or any suitable means to the side walls 31 and 32, 31 being the right side wall and 32 the left side wall in relation to the positions where the operator sits or stands in using the machine. These walls 31 and 32 also compose the walls of the S-shaped chuteway or the magazine in which the rolls are stored and these side walls constitute the main side wall pieces of the machine, and their upper edges 33 and 34 see Fig. 12, compose the tracks of the trackway upon which the impression carriage rides. The plugs 23, 24, 25, and 26 are provided with little shafts 35, 36, 37 and 38 respectively, see Fig. 11, and these shafts are supported by outer supporting slips or brackets 39, 40, 41, and 42 secured to the side walls 31 and 32 in any suitable manner but here shown by screws and rivets thus the spindle plugs 23, 24, 25, and 26 are held in alignment and when they are engaged into the tubular portion 7 of the hectograph spools the spindle plugs and spindles themselves, as it were, form a complete shaft adapted to carry the wound up hectograph sheet on the spools.

These spindle plugs are adapted to be reciprocated inward and outward lengthwise in their bearings in the function of engaging and disengaging the ends of the tubular spindles 7 of the hectograph spools or spindles and this lengthwise movement of the spindle plugs is brought about in the direction of engaging the hectograph spindles by a series of flat leaf springs 43, 44, 45, and 46 which springs are secured through the medium of brackets 471 to the frame walls 31 and 32 the brackets being riveted or otherwise suitably secured to the said walls. The disengagement of the spindle plugs 23, 24, 25, and 26 from the ends of the hectograph spools is brought about by a series of cam blocks 47, 48, 49 and 50 secured to the springs 43, 44, 45, and 46 respectively and carried by the said springs as integral parts thereof and these cams are acted upon by a series of cam rollers 51, 52, 53, and 54 acting against the cams on one side and against the walls 31 and 32 on the other side and a movement horizontal of these cam rollers brings about the movement of the spindle plugs 23, 24, 25, and 26 into and out of engagement of the tubular spindle 7 of the hectograph spools.

The cam roller 51 is mounted onto an arm 55 connected to a lever 56 mounted on a rocker shaft 57 which extends across the machine and is provided on the other side with a lever arm 58 into which is hinged the arm or rod 59 upon which is mounted the cam roller 52. Upon this shaft 57 there is a hand lever 60 having a handle 61 which extends out in easy reach of the operator as shown by Fig. 2.

To the lever arm 56 at the left of the machine there is also connected a link or rod 62 which extends to the rear of the machine and carries cam roller 54. A similar rod 63 at the right moves cam roller 53. Thus by movement of handle 61 downward the spindle plugs are released from the hectograph spools by the cams and cam rollers and an upward movement of the handle 61 allows the springs to move the spindle plugs into engagement with the spools.

The hectograph spools are moved see Figs. 4, 5, 6, and 7 from the position 21 at the lower end of the S-magazine and upward thru the vertical chuteway to the position 15 see Fig. 7 through the medium of a foot lever or treadle bar 64 secured into the ends of the levers 65 hinged at 66 into the blocks 67 fastened into the walls 31 and 32 of the machine. The outer ends 68 of the lever 65 are connected by hinge pins 69 to links 70 hinged at 71 to a double set of vertical reciprocating bars 72 one at each side of the machine see Figs. 5 and 7 which bars 72 are composed of two pieces separated from each other by spacing blocks 73 shown in dotted lines in Fig. 7. Mounted in between the two pieces of the vertical bars 72 there is provided a series of push pawls 74, hinged at 75 into the said bars 72 and the said pawls are adapted to engage the tread portions 9 of the hectograph spools.

The pawls 74 are thrown downward or toward the tread portions 9 of the hectograph spools by means of little springs 76. When the bars 72 are moved upward and downward through the medium of a foot treadle bar 64 the pawls 74 move upward the hectograph spools on the upward movement and spring by them on the downward movement of the bars 72.

The inside edge of the bars 72 furnish one side of the vertical chuteway for the tread portions 9 of the hectograph spools while there are provided vertical walls 77 fixed to the side walls of the machine to furnish the other side of this vertical chuteway up through which the hectograph spools pass under the influence of the pawls 74.

As the spindles pass upward through the vertical chuteway formed by the walls 77 and the edges of the bars 72 they are retained in their upward positions by a series of spring pawls 78 see Figs. 4 and 7, which spring pawls 78 are adapted to enter the ends of the tubular portion 7 of the hectograph spindle and hold the same in upward position when any given spool is pushed upward the right distance through the movement of the foot treadle 64. The pawls 74 are wanting in the lower region or region of the position 21 and are also wanting at the upper region in the lifting of a given spool from the position 79 to the position 15 see Fig. 7 and to lift the spools at these positions.

In place of the pawls 74 at the bottom and top of the vertical chuteway I provide sets of double spring pawls 80 and 81, 80 being the lower set which engages the lowermost spool in the S-chuteway on the upper side of the flanges 9 of the hectograph spool and these pawls 80 and the pawls 81 are connected to bracket bars 82 and 83 respectively which extend outside of the walls 31 and 32 of the machine, see Fig. 2.

Pawls 80 extend through slots 84 in the sides of the side walls 31 and 32. The pawls 81 likewise extend through slots 85 in the side walls of the machine. The pawls 80 engage the inner sides of the tread portions 9 of the spools while the pawls 81 engage the outside of the tread 9 of the spool. Thus the pawls 80 lift the spool from the position of 21 upward to be engaged by a spring pawl 78; at the same time the pawls 81 lift the spool from the position of 79 upward to position 15 to be engaged by spindle plugs 25 and 26; at the same time the pawls 81 lift the spool to the position of 15 the hand lever 61 is operated to bring the spindle plugs 25 and 26 through the action of the springs which control them into engagement with the ends of the tubular spindle portions 7 of the hectograph spool. Thus by a proper operation of the handle 61 by the hand of the operator and the operation of the foot treadle 64 by the foot of the operator a series of spools are lifted from the position 21 upwardly through the vertical chute successively to the position 15 at the outer end of the machine from which the hectograph sheet is drawn out and over the impression bed or platen 14 and connected to the spool at position 16 at the front of the machine.

When the hectograph sheet is exhausted from the position of the outer end or supply end position 15 of a given hectograph roll that hectograph sheet has been transferred onto the spindle at the position 16 in the front end of the machine whereupon the loaded spindle at position 16 is taken out and the end of the hectograph sheet wrapper secured as described and the spool reversed end for end and deposited in the end of the S-chuteway ready to have that spool follow down its turn through the magazine or storage section of the machine.

At the release of the loaded spindle at the position 16 by the hand lever 60 as described there is simultaneously released the empty spool at the position 15 and upon the release of this empty spool by the withdrawal of the spindle plugs 25 and 26 the then empty spool drops down until its treads 9 come in contact with the treads of the spool below in the position 79 and whereupon this empty spool rolls off to the left as shown in Fig. 7 and drops down into the inclined trackway 86 as indicated by the position 87 and rolls toward the front end of the machine or the left of Fig. 7 and is arrested at position 16 by the stop blocks 88 which registers that empty spindle to be engaged by the spindle plugs 23 and 24 whenever the operator lifts the hand lever 61 thus releasing the springs which control the plugs 23, 24, 25, and 26 to engage the ends of the hectograph spools. This takes place at the time when the operator is holding down by the foot the foot treadle 64 which has then brought up to position 15 the loaded spindle from the position 79 to the position 15 through the medium of the double spring pawls 81 and thus when the operator moves the lever 61 there is simultaneously locked or engaged in place a loaded spool at position 15 and an empty spool at position 16 ready for servicing the hectograph sheet anew from the position 15 over the impression bed 14 to and onto the empty spool at position 16 at the front of the machine; thereupon, the operator releases the foot from the treadle 64 and the bars 72 drop downward and the foot treadle 64 rises upward under the influence of the gravity of the parts at the right of the hinge 66 and this return movement is aided by the springs 89 which assist in bringing the foot treadle 64 back home.

The bracket bars 82 and 83 which carry the pawls 80 and 81 are secured to the bars 72 through the medium of small blocks 90 see Fig. 5 which pass through slots 91 and 92 Fig. 2 in the side walls of the machine and the ends of these bracket bars 82 and 83 are engaged by slotted blocks 93 Fig. 5 at the outer ends which hold them in alignment and they are spaced apart from the body of the walls of the machine by strip blocks 94; thus by guiding these bars 82 and 83 in this manner the pawls which they carry are secured or retained in their desired position throughout their movement.

The edges of the side walls 31 and 32 are, as it were, bound or hemmed by angle pieces 95 see Figs. 2 and 5 which are also slotted where the slots 91 and 92 occur. These angle pieces 95 furnish a back wall to sustain the bar 72 against the thrust of the pawls 74 when the spools are being lifted up the vertical chuteway.

The bottom of the edges of the side walls 31 and 32 are hemmed by angle pieces 96 and the front edges of the walls are provided with angle trimmings 97. The mechanism composed of the bracket bars 82 and 83 and the pawls 80 and 81 being on the outside of the walls 31 and 32 are more or less unsightly and I provide a covering for this portion of the side of the machine in the form of cover plates 98 one on each side of the machine. These cover plates are held apart from the walls 31 and 32 by small studs 99 see Fig. 2.

The mechanisms composed of the levers 56, 58 and the springs 43, 44, 45, and 46 and their rollers and rods being the mechanism that are exposed to view as shown in Fig. 2 are covered up and protected by the cover plates 100 shown in the section on the plan view Fig. 11 and likewise in section in Fig. 2; thus the appearance of the machine is improved by these cover plates 98 and 100.

The cover plates 98 are provided with inturned flanges 101 see Figs. 5 and 11 which flanges are spaced apart a short distance from the angles 95 leaving a slotway into which I place an end cover piece 102. This piece 102 extends down and covers up the rear end of the machine covering up the end of the magazine and the vertical chuteway up through which the spools are passed.

This plate 102 might be termed a slide which may be lifted out and replaced or turned around as to its face being outward or inward as desired and on the top edge of this cover plate 102 I provide a flange 103 adapted to support a moistening device having a water box 104 which is held into the flange 103 by spring clips 105 see Figs. 2 and 7.

By this arrangement the water box 104 may be slipped on or off from the flange 103 as desired and when the machine is closed up and out of service the end plate or slide 102 is lifted up and out of its embrace by the flanges 101 of the cover plate 98 and turned around with flange 103 overlapping the top of the machine, thus covering up entirely the open outer end of the magazine part of the machine.

The side walls 31 and 32 are braced across by the plate 86 and by cross plates or tie plates 106 and 107 secured to the angle pieces 77 which form the side of the vertical chuteway for the spindle spools see Fig. 7. A cross plate 108 at the bottom of the S-chuteway ties across the walls 31 and 32 at this region.

The S-chuteway is formed of angle pieces 109 on one side and 110 on the other side that are secured to the walls 31 and 32 and furnish the trackways 18 and 19 for the flanges at the ends of the hectograph spools. Thus the space between the side wall is open only as it may be occupied by the rolls in the chuteway and by the cross members 86, 106, 107, and 108, these cross members being secured to the angle iron members which form the chuteways.

At the front of the machine there is a cross tie member 111 which is secured to the inside of the angle marginal strips 97. For the purpose of getting access to the spools in the S-chuteway magazine in the event of the spools getting out of line, I provide a gateway 112 hinged at 113 to the cross tie plate 108 and this gate is secured by any suitable latch 113 in the cross tie plate 111.

When the machine is not in use and it is desired to close up and enclose the magazine to protect the rolls in the chuteway from becoming damaged by the dust or from any other cause I provide a folding gate for the entrance 22 of the chuteway and to cover over the space entering to the position 16 of the hectograph spindles and this folding gate is composed of an upper piece 114 hinged at 115 to the lower piece 116 which latter is hinged at 117 at the region 22 of the S-chuteway. This folding gate is provided at the top with any suitable latch or catch 118 which holds it in open position as shown in Figs. 2 and 7 where the pieces 114 and 116 are folded together and held in that folded together position by this said latch 118 but when the folding gate is lifted to close the entrance of the S-chuteway and close the end of the space immediately under the impression bed 14 the folding gate is lifted up to position shown in Fig. 8 wherein the latch 118 is hooked over little pins 119 to the side walls of the machine.

Since the pieces of this folding gate are hinged in the middle as indicated by 115 in order to stiffen and hold the gate in place when shut as shown by Fig. 8 I provide small spring friction clasps 120 see Figs. 7 and 8 which when the gate is closed serves to steady the middle portion of the folding gate in place.

The hectograph spools as described held in position of service in relation to the impression bed or platen as shown in Fig. 11 are turned in the winding and unwinding and held in fixed positions through the medium of little projections 121 on spindle plugs 24 and 26 which engage the notches 13 in the end of the tubular portion 7 of the hectograph spindle or spool. The spindle plugs 23 and 25 are allowed to revolve freely their purpose being only to support the ends of the hectograph spindle in proper alignment but the spindle plugs 24 and 26 are those which control the revolutions of the hectograph spools in servicing the hectograph sheet over the impression bed. Upon the shaft of the spindle 24 there is fixed a ratchet 122 which is adapted to be engaged by a pawl 123 Fig. 10 mounted upon a stud 124 and held in engagement to prevent the revolution of the ratchet in the reverse motion by the spring 125 which spring is connected to the pawl 123 and to a cross end wall 126. The pawl 123 is held out of engagement with the ratchet 122 by means of the small lever 127 hinged at 128 to the frame of the machine and connected by a link 129 to the end 130 of the said pawl 123. Thus, as desired, the ratchet 122 and the spindle plug 24 may be arrested from the revolution in one direction as desired by the operator. A hand wheel 131 provided with the handle 132 is mounted on shaft 36 of the spindle plug 24 by means of which hectograph spool at the position 16 is revolved in winding upon that spool the hectograph sheet.

The spindle plug 26 at the outer end of the machine has secured upon its shaft 38 a ratchet 133 similar to the ratchet 122 but with the teeth adversely arranged from that of the ratchet 122 and this ratchet 133 is controlled by a pawl 134 mounted upon a stud 135 fixed in the framework and the outer end 136 of this pawl 134 acts as a weight to hold the pawl into engagement with the ratchet 133. A stud 137 in the pawl 134 provides a means for fastening a rod 138 used to disengage the pawl 134 from the ratchet 133. This rod 138 extends to the front of the machine and terminates in a milled plug 139 adapted to be grasped by the operator in pushing the rod to release the pawl 134 from the ratchet 133. A spring 140 abutting against the little cross wall or end wall 126 serves to normally hold the rod 138 to allow the pawl 134 to engage the ratchet 133.

A small collar 141 fixed on the rod 138 passes through a hole in the wall 126 which hole is a little larger than the collar 141 and when the operator wishes to hold the spring 140 into compression and thus hold the pawl 134 free from engagement with the ratchet 133 the end 139 is pushed in and downward pressing the spring 140 until the collar 141 is entirely within the inside of the wall 126 and then the edge of the collar abutting against the edge of the hole through which it passes in the wall 126 holds the spring 140 into compression until such time when the operator lifts the end 139 to again free the spring 140 to push the rod 138 out allowing the pawl 134 to again engage in the ratchet 133.

Thus by means of the end 139 of the rod 133 and the little lever 127 the operator may engage or disengage the ratchet 133 by or from the pawl 134 to permit a free movement as desired of the hectograph spools at the position 15 in the machine. Upon the shaft 38 of the spindle plug 26 there is mounted a sprocket wheel 142 which is engaged by a chain 143 extending back to a sprocket 144 on the short shaft 145 mounted in a bracket bearing 146 and in a bearing of the side frame pieces or wall 32 and upon this shaft 145 there is mounted a hand wheel 147 Fig. 11 having a hand handle 148 by means of which the spindle plug 26 carrying any given hectograph spindle may be revolved as desired by the hand through the medium of the said hand wheel 147 and thus winding or unwinding the hectograph spindle at the position 15 of the machine wherein the spindle is mounted for service in relation to the impression bed.

Thus, the hectograph sheet may be wound or unwound upon either one of the spindles at either end or position 15 or 16 of the machine and the spools in those two positions may be locked for holding the hectograph sheet to be tautly drawn over the impression bed 14. The portion of the hectograph sheet laid upon the impression bed 14 in the hectograph work is indicated by 149, see Fig. 7.

As before stated, the top edges 33 and 34 of the side wall frame plates 31 and 32 see Fig. 12, form trackways upon which the impression carriage is supported. Outside of these trackways 33 and 34 on each side there are provided flat bars 150 secured to the blocks 151 which in turn are secured to the walls 31 and 32 and the said blocks form the spacing means for holding the bars 150 asunder from the side walls 31 and 32 see Fig. 12. Secured to the outer top edge of the bars 150 there are angle bars 152 which act as shelves for the top flanges 153 of the plates 100 and assist in supporting the said cover plates in position. On the inside of the bars 150 there are secured rack bars 154 which are engaged by the gear wheels on the impression carriage for the purpose of holding the impression carriage always squarely in position to the impression bed 14 in the travel of the impression carriage to and fro over the impression bed.

The racks 154 being spaced outward from the trackways 33 and 34 provide slotways 155 which allows for the flanges of the wheels of the impression carriage to set down on the outside of the trackways 33 and 34. The tops of the rack teeth 154 are flush level with the tops of the trackways 33 and 34 and the impression bed 14 is supported by the side walls 31 and 32 at approximately the same level as to the tops of the trackways 33 and 34.

The impression bed is composed of a metal sheet as indicated at 14 before mentioned which may or may not be covered with an impression blanket or cloth or other material indicated in Fig. 12 as 156. The impression bed 14 is secured by the angle brackets 157 to the walls 31 and 32 of the machine.

On each side of the machine supported on the flanges 153 of the cover plates 100 I provide detachable shelves 158. These shelves 158 are locked in place by small hooked shaped lugs 159 see Fig. 10 which pass down through slots in the flanges 153 and the angle bars 152 but any suitable means may be employed by fastening these shelves 158 to the sides of the machine. These shelves are a convenience for holding paper used in the copy work. An extra set of notches or slots in the flanges 153 and in the angle piece 152 are provided to permit adjustment of these shelves 158 corresponding to the length of the machine or push them forward to the position of the dotted lines 160 see Fig. 1. When the machine is out of service and it is desired to cover up the impression bed the shelves 158 are detached from the sides of the machine and are placed over the top of the impression bed or platen thus covering up entirely the top of the machine which then may be used as a table.

The hook shaped lugs 159 then come down into the open clearance spaces at each end of the impression bed of the machine since the bed does not extend the full length of the top of the machine.

By means of the folding gate composed of the folding up pieces 114 and 116 and the gate 112 and the end plate 102 and shelves 158 the machine may be closed up completely at each end and at the top but in doing this the end plate 102 is lifted out and reversed bringing its flange 103 overlapping the top of the outer end of the machine. The water box 104 being removed when this closure is made.

As the hectograph sheet 2 is wound from the spindle position 15 to the spindle position 16 over the impression bed 14 for the service of the portion 149 of the hectograph sheet in making copies, it is necessary to moisten the gelatin surface or hectograph surface in order to properly make the copies. This moistening may be done by hand with a sponge or a cloth or any suitable moistening means but I prefer to use the moistening device for the hectograph sheet composed of the waterbox 104 as previously mentioned into which there revolves a flanged roller 161 mounted in the waterbox over which there travels felt tapes or tapes of any suitable material 162 which tapes are trained over a secondary roller 163 journalled at 164 to links 165 hinged at 166 on the axis of the roller 161.

By swinging the links 165 forward or back the tapes 162 are permitted to ride by gravity onto the hectograph sheet at the spindle position 15 as indicated by the dotted position 167 see Fig. 7.

A frictional contact of the tapes 162 on the gelatin surface is sufficient to revolve the tapes and rollers over which they travel. While I have shown separate pieces of tapes 162 see Fig. 1, I may use one continuous sheet of felt or other suitable material but I prefer to use separate tapes and guide them laterally by the means of flanges 168 on the roller 161 which revolves in the water box 164.

Owing to the ability of the links 165 to rock upward and downward the tapes are permitted to follow the changing in diameter of the hectograph sheet 2 as it is wound or unwound from the spool at position 15.

The waterbox 104 carrying with it the tapes and rollers as described being easily removed is a great desideratum since more or less fouling of the tape takes place from the water box from contact with the gelatinized hectograph sheet as the water takes up, as it were, a little of the substance of the gelatinized sheet and other foreign matter so that frequent cleaning of the water and tapes is necessary and it is a great convenience to be able to take these things out of the machine over to a washing sink to clean them and refill with clean water.

In the service of the machine the hectograph strip 2 may be moistened as it is unwound from the position 15 to the position 16 and if it is desired the operator may rewind the strip back from the position of 16 to the position of 15 through the mechanism described using the hand wheel 147 for this purpose. On the return of the hectograph strip from the spool position 16 to that of 15 again the strip may be moistened so that the operator may as he chooses moisten the hectograph strip in the winding or unwinding as he desires from and to any given spindle in the position 15 in the machine.

The mechanism shown and described up to this point of the specification relates to the handling of the hectograph strip in the course of its going to and from upon the impression bed or platen 14.

Some devices in which hectograph copying is accomplished the impression onto the hectograph bed is made by hand without using any other mechanism outside of a sponge or piece of cloth with which to impress the copy upon the hectograph surface and some of them use a hand roller to impress the copy on the hectograph surface and then remove the copy by hand. Parts of the mechanism described up to this point could be used in such service.

Figure 20:
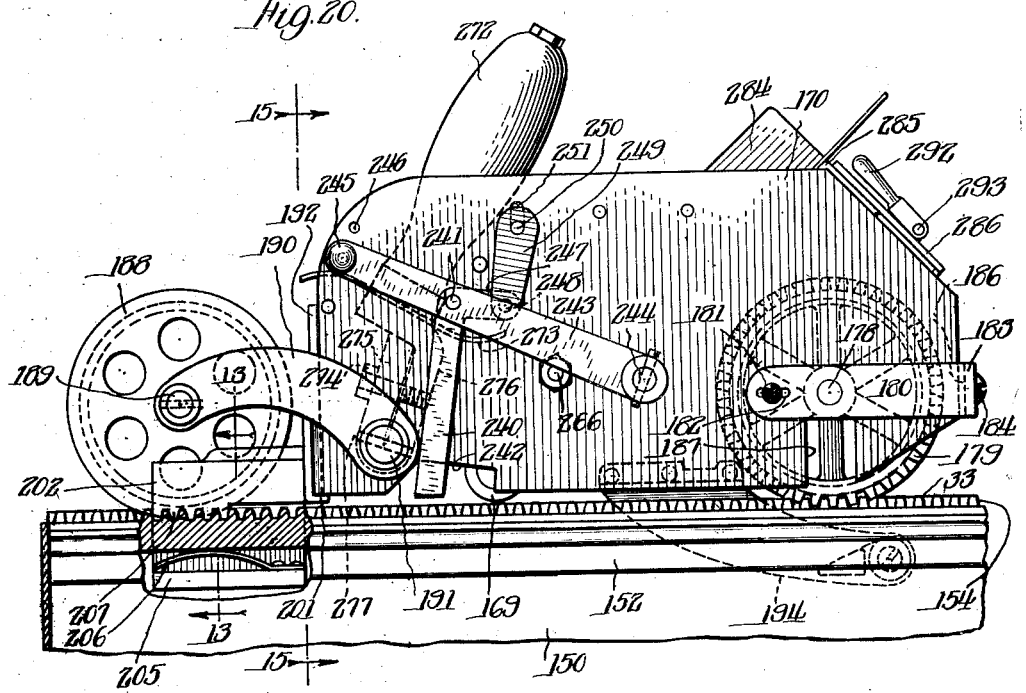
Fig. 20 is an elevation of the impression carriage on the right side of the carriage looking in the same direction as that shown in Fig. 2 with a part broken away to show the arrangement of the carriage stop.

However, the machine here shown is highly efficient and adapted to the use of what are termed impression carriage or automatic mechanism, as it were, for applying the paper copy and taking it from the hectograph surface. The impression carriage is provided with a suitable framework mounted on wheels and adapted to move backward and forward over the impression bed of the machine and carry an impression roller 169 preferably rubber faced to engage and impress the copy upon the hectograph surface and to release therefrom and permit the removal of the said copy. The frame of the impression carriage is composed of an end frame piece 170 at the right side of the machine and 171 the left side. In Fig. 20 the frame piece 170 is shown and in Fig. 21 the frame piece 171. These two vertical frame plates are connected across by a diagonally inclined frame member 172 having end flanges 173 and 174. These flanges are connected by rivets 175 to the vertical end plates 170 and 171. The cross frame member 172 becomes a guideway or paper support for the paper copy 176 used with the work of hectograph copying as shown in place in the figure just mentioned.

The rear end of the impression carriage is supported on flanged wheels 177 mounted loosely on a shaft 178 and adapted to ride on the trackways 33 and 34 as previously mentioned at the top of the frame side plates of the machine.

Fixed at the shaft 178 outside of the flange wheels 177 see Fig. 12 there are gear wheels 179 which engage the racks 154. The purpose of these gears being fixed to the shaft 178 is that as the carriage moves backward and forwards each end will move back and forwards simultaneously the same exact amount and thus hold the impression carriage squarely in place in all positions of its movement.

In order that the carriage may be squarely adjusted to accommodate for any slight variation in its manufacture the shaft 178 is mounted in adjustable bearing pieces 180 see Fig. 20 secured at one end by screws 181 screwed into the end frame pieces through slotted holes 182 which permits the adjustment of the bearing pieces 170 horizontally in relation to the frame.

Figure 22:
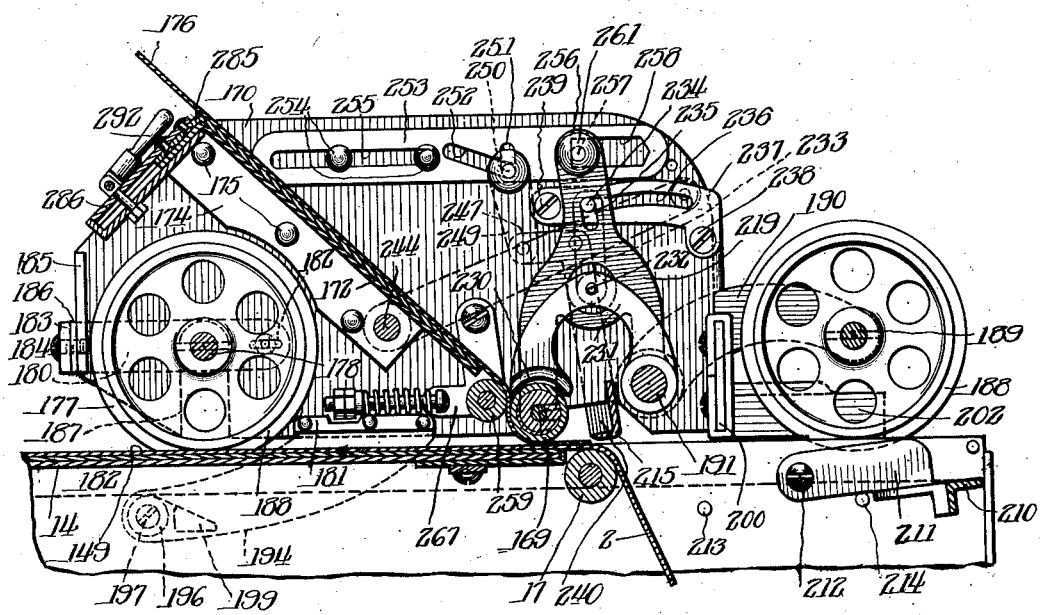
Fig. 22 is a similar view to that of Fig. 21 showing the position of the parts in the same position as that of Fig. 21 but looking in the opposite direction from that of Fig. 21.

The outer ends of the bearing pieces 180 are turned over at right angles in the projections 183 secured by the screws 184 to turned over flanges 185 see Fig. 22 of the end frame pieces. Packing pieces 186 are provided to permit by varying their thickness to adjust the bearings 180 of the shaft 178 at either end longitudinally to bring the impression carriage with its impression roller 169 exactly square to the travel of the carriage over the platen. Apertures 187 in the vertical end frame piece permit the introduction of the shaft 178 into place to be held by the bearing pieces 180. The front end of the impression carriage is supported by the flange wheels 188 likewise travelling on the trackways 33 and 34. These wheels are fixed to and supported on to the shaft 189 and this shaft is carried in bearing arms 190 hinged onto a rocker shaft 191 supported in suitable bearings in the end frame pieces 170 and 171. Projections 192 on the end frame pieces turn outward from the main portion of the frame best observed in Fig. 20 arresting the movement of the arms 190 upward from the position shown in Fig. 20 and thus supports the carriage using the projection 192 for preventing the arms 190 rocking upward about the shaft 191. When it is desired to train over the bed the end of a fresh hectograph sheet or strip it is necessary to lift the front end of the carriage for clearance of the roll 169 in order to allow the passage through underneath the carriage for the end of the gelatinized hectograph strip 2 and this lifting of the front end of the carriage is accomplished by revolving the arms 190 about the shaft 191 bringing the wheels 188 underneath the front end of the carriage as shown by Fig. 26, the wheels 188 and the shaft 189 being far enough under the shaft 191 to put the carriage in stable equilibrium permitting the entrance of the hectograph sheet underneath the carriage on its supporting wheels 177 and 188, the wheels 188 in the position of Fig. 26 resting in contact with a clamping roller 259 or any other suitable part of the frame and in this position the carriage may be moved backward and forward as needed in training the hectograph sheet underneath the carriage and over the bed of the machine.

Figure 21:
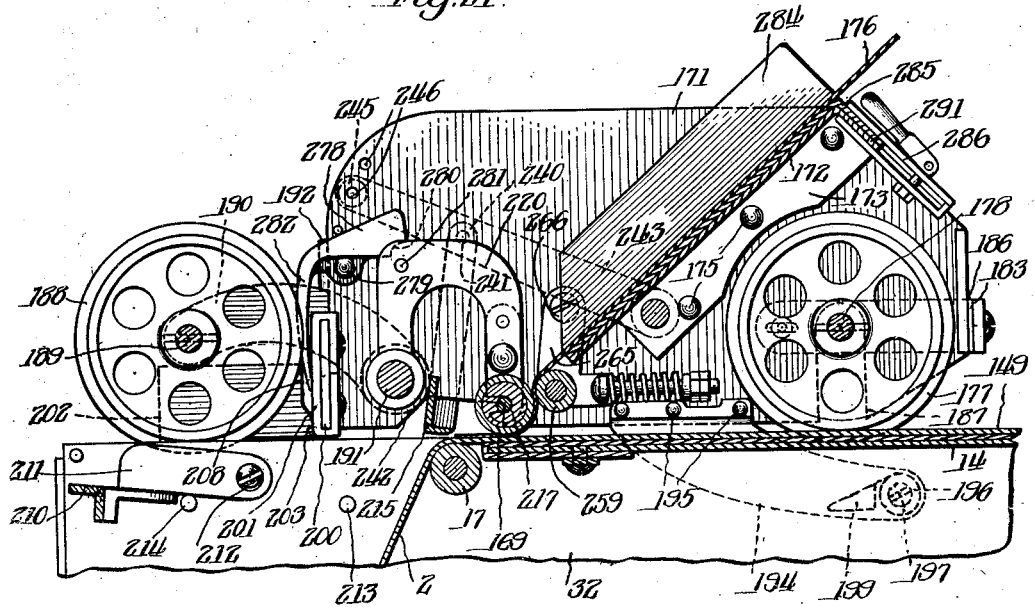
Fig. 21 is a sectional elevation through the impression carriage looking from the direction shown in Fig. 20 on line 21—21 of Fig. 15 showing the position of the parts when the paper is first impressed on the gelatin pad on the impression bed using the marginless margin bar of the machine.

To prevent displacement entirely of the impression carriage from the trackways 33 and 34 I secure arms 194 by screws or rivets 195 to the end frame pieces 170 and 171 which arms extend downward through the slots 155 to a position below the racks 154 and on the lower ends of these arms 194 are provided small rollers 196 on pins 197 that are under the edges 198 of the racks 154 see Fig. 12 to prevent the lifting of the carriage when the carriage is down in normal position as shown in Figs. 20 and 21. In addition to the little rollers 196 on the ends of the arms 194 I provide projections 199 that are adapted to engage the lower edges 198 of the racks 154 when the carriage is in the position shown in Fig. 26. The carriage is entered to the trackways 33 and 34 endwise of the slots 155 of either end of the machine as desired the point involved in the entry in this manner is that the wheels 177 and 188 should be carefully entered squarely to bring the gear teeth of the gears 179 into the right mesh on each side with their respective racks.

At the front end of the frame members 170 and 171 there is turned inwardly the projections 200 see Fig. 21 around which there is enwrapped and secured in place a rubber bumper member 201. The projections 200 rubber faced with the rubber 201 are adapted to abut against stop blocks 202 one of these blocks being provided at each side of the machine as indicated in plan in Fig. 1. These stop blocks may be properly termed registering blocks for they arrest the carriage at the predetermined point for the purpose of taking the copies at any given place on the bed in the operation of the machine. One of these blocks is shown in detail in Figs. 13 and 14 the main block being indicated as 202 with the abutting face 203 which abuts against the rubber. The body portions 204 of the blocks extend down in through the slots 155 and are provided with lower projections 205 which extend underneath the lower edges 198 of the racks 154 and to these projections 205 are fixed springs 206 normally holding the block downward onto the racks 154. Rack teeth 207 on blocks 202 are adapted to engage the rack teeth of the racks 154 with the springs 206 holding the teeth 207 down onto the racks. Thus the blocks are held against any travel along the racks. By pulling upward on the body of the block 202 and compressing the springs 206 the rack teeth 207 of the blocks may be lifted clear of the rack teeth of the fixed rack 154 and thus the blocks 202 may be adjusted to stop the platen carriage in any desired position as relates to the platen.

The block 202 at the left side of the machine as shown in Fig. 21 has its front or abutting edge cut away as shown by 208 for a distance at the top edge of the block to accommodate a latch that will be described later.

It is sometimes desirable to stop the outward movement of the carriage from the front of the machine. To accomplish this I provide the same sort of stop blocks as that of 202 one of these blocks being indicated as 209 in Figs. 1 and 2 and this block is adjusted backward and forward over the machine just the same as the blocks shown in Figs. 13 and 14 but it abuts against the rear edge of the impression carriage. However, not many operators use this stop block at the rear of the machine for arresting the outward movement of the carriage.

In the hectograph copy work in which this machine is particularly used there are two systems of copying required, one of them requiring that a copy be made down to the margin of the paper corresponding to the term marginless copy used in many cases with cards which are put into files. With another class of copying the close margin near the edge of the paper is not desired. Still another system of copying is desired which permits the operator to shove the paper through allowing any margin desired determined by the hand of the operator and it is desirable to provide in the same machines the ability to make marginless copies and other copies as desired. Heretofore, the practice has been to provide a separate impression carriage one for marginless work and the other for general work. There is provided in this machine extra parts normally installed in the machine at all times that permits the operator with a slight adjustment quickly made to have his machine as a marginless machine or a general machine as he sees fit. One of the great advantages of this machine is that you may make both the marginless copy and the other type of copy in exact registration so that your duplicate will always correspond with the copy which is put down at the start of the work.

Figure 23:
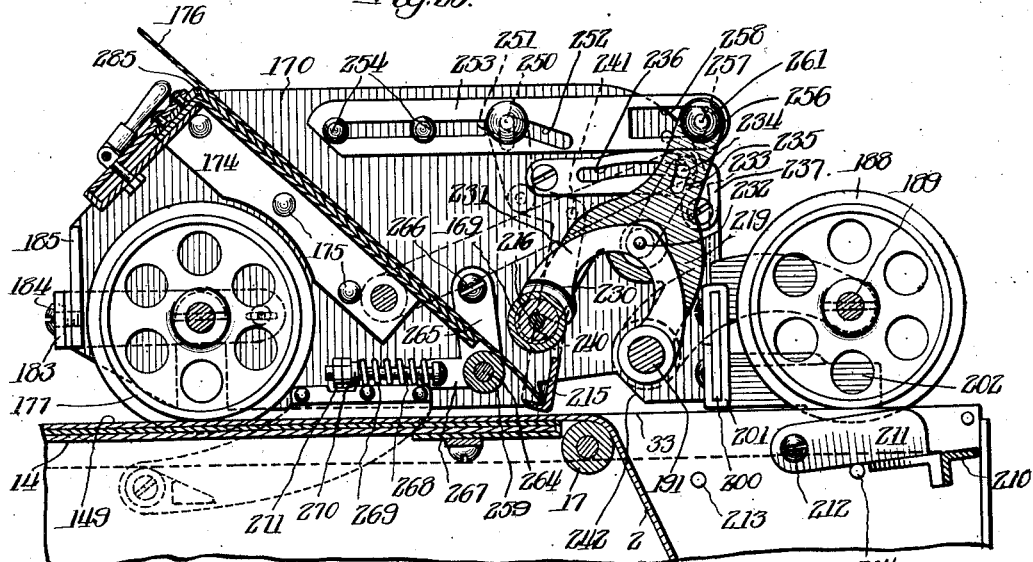
Fig. 23 is a similar view to that on Fig. 22 showing the position of the parts of the impression carriage and marginless margin bar at the time the paper is inserted ready to start to make an impression.
Figure 24:
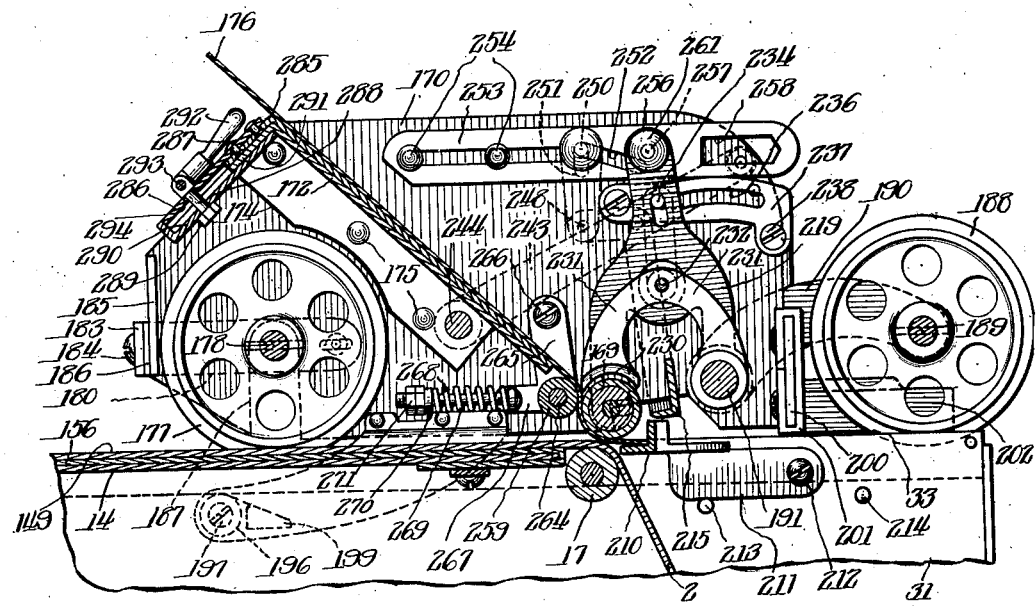
Fig. 24 is a similar view to that of Figs. 22 and 23 but showing the position of the parts when the ordinary margin bar is used and the paper in place ready to start an impression on the gelatin pad.
Figure 25:
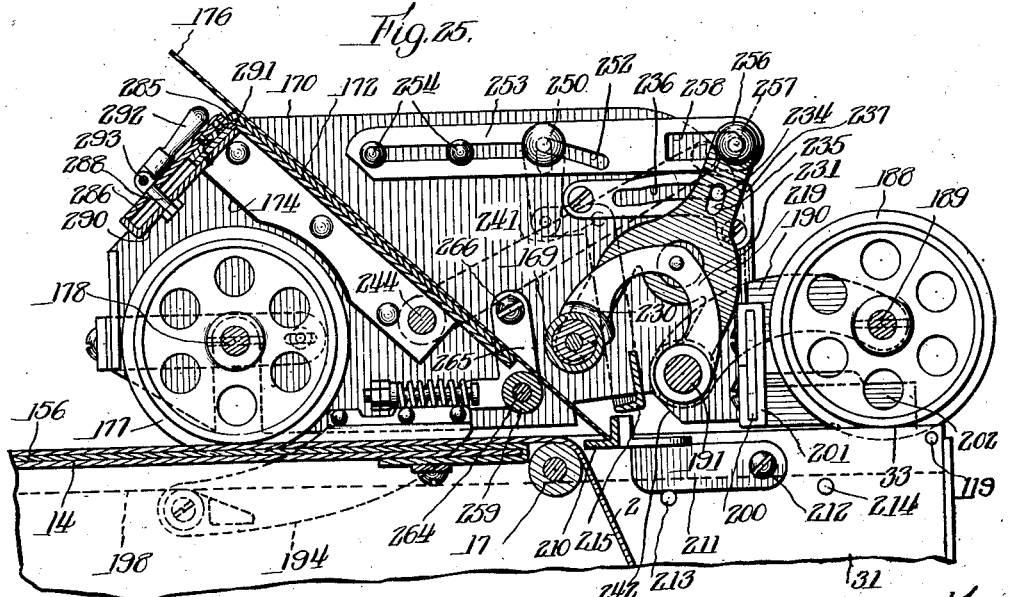

To accommodate the general classes of work desired to be done in this machine I provide a margin bar 210 in the shape of an angle cross bar see Figs. 24 and 25 supported on arms 211 hinged at 212 into the frame members 31 and 32. When this margin bar 210 is in service position the arms 211 rest on the pins 213 shown in Figs. 24 and 25 and when out of service the bar is thrown over to the position shown in Figs. 22 and 23 with the arms 211 resting on the pins 214.

In Fig. 24 the impression roller 169 is shown in the position of registering the master copy or the copy to be made on the first contact with the hectograph sheet 149 ready for the movement of the carriage forward across the platen surface.

For the work of making marginless copies I provide a margin bar 215 which is supported in and carried with the impression carriage. Figs 22 and 23 show positions of this marginless margin bar in service. Fig. 23 showing the entrance of the paper 176 on the margin bar ready to be clamped down upon the hectograph sheet 149. Fig. 22 shows the paper so clamped and in contact with the hectograph sheet ready for the movement of the carriage over the bed surface. Thus it will be seen from Figs. 21 and 22 and 23 that the end of the copy sheet is in full contact with the hectograph sheet 149 clear to its end while in Figs. 24 and 25 it will be observed that the end of the sheet 176 remains on the margin bar for the end of the copy sheet.

Where copying is to be desired by registering the paper by hand the margin bars are thrown out of service the margin bar 210 being placed in the position of Figs. 22 and 23 and at the same time the marginless margin bar 215 is likewise in its position out of service as indicated by Figs 24 and 25 and thus there will be a clear way for the paper sheet 176 to be adjusted downward thru the impression carriage to any distance desired in the front or apast the hectograph spool portion 16 at the front of the machine.

In the shifting of the service from the general bar 210 to the marginless margin bar 215 it is necessary to adjust the blocks 202 a short distance closer to the bed surface and it will be observed by comparison of Figs. 20 and 21, 22, 23 with those of 24, and 25 that the blocks 202 are set nearer the bed surface for the marginless margin bar work as compared to the general margin bar work.

The impression roller 169 is carried in the bearings 216 and 217 in arms 219 and 220 on a rocker shaft 191 see also Figs. 15, 16 and 17. The impression roller 169 comes directly in contact with the hectograph sheet 149 which together with the lint from the paper and other foreign matter becomes more or less foul in the service and to facilitate taking out this roller 169 and clean it, there is arranged convenient means for disengaging this roller from the bearings 216 and 217 and this mechanism is best understood from Figs. 16 and 17. The bearing 217 is open at the bottom as all the pressure involved with the roller 169 is on the journals 221 when the arms 219 and 220 are pressing down upon the journals 221 holding the impression roller 169 in the downward position onto the bed and the load on the journals 221 in the opposite direction is simply the idle weight of the roller 169. Thus I provide the bearings 216 and 217 having a rather large bearing surface where the load takes place and being open at the bottom for freeing the roller as indicated by 222 Fig. 16. However, to hold the journals 221 in place I provide latch members 223 hinged at 224 to the arms 219 and 220. This latch has an open slot 225 Fig. 17 which permits the latch to be swung clear of the journals 221 around the hinge pins at 224. To hold the latch 223 in the position to hold the journals 221 in place I provide a spring actuated locking pin 226 mounted in a projection 227 in the arm 220 and controlled by a spring 228 to hold the pin 226 into engagement with the latch 223 and on this pin I provide the button head 229 which permits the operator to contract the springs 227 to release the latch 223 and allow it to swing clear of contact with the journals 221. Thus the operator may easily remove the impression roller 169 from the impression carriiage.

The impression roller at the time the paper is admitted to the margin bars is held up by the rocker shaft 191 in the position shown in Figs. 23 and 25 and in the acts of pressing the paper down in contact with the hectograph sheet to the position shown in Figs. 22 and 24 it is desirable to hold the impression roller 169 from revolving upon its journal. To hold this roller 169 against movement as the paper is clamped down there is provided a braking mechanism having a brake shoe 230 Figs. 1, 22, 23, 24, and 25 which is normally held in contact with the impression roller 169 to prevent its movement at all times save only when the roller has arrived in its downwardmost position of holding the paper onto the hectograph sheet 149 on the bed. This brake shoe 230 is supported in an arm 231 which is mounted on the shaft 191 having a slight angular movement on shaft 191. The arm 231 carries near its free end a pivot screw 232 on which there is mounted a link 233 to which is connected a pin 234 which passes through a slot 235 in the arm 219 and thus the pin 234 is moved with the arm 219 as the rocker shaft 191 is rocked about in raising and lowering the impression roller 169. A cam track 236 in a cam piece 237 fixed to the frame member 170 by the screws 238 and 239 see Fig. 22 is engaged by the pin 234 and thus the pin 234 is made to raise and lower the brake shoe 230 to conform to the shape of the cam track 236 and this is such that the brake shoe 230 is released free from the impression roller 169 when the same is down upon the paper permitting the roller to move in the impression work of making the copy.

The marginless margin bar 215 is carried upon arms 240 Fig. 20 which arms are on the outside of the frame members 170 and 171 and this is permitted by the marginless margin bar 215 extending through openings 242 in the frame members 170 and 171 these openings being simply notches 242 in the open edges of the frame member. Hinge pins 241 on the arms 240 are carried in lever arms 243 also on the outside of the frame members 170 and 171 and these lever arms are fixed to a cross shaft 244 in a manner that the arms 243 on each side of the impression carriage are held by the shaft 244 in alignment in the slight movement involved in their use.

The upper ends of the lever arms 243 are provided with mill headed conical pointed pins 245 see Fig. 15, the conical points of which are adapted to engage small holes or depressions 246 see Fig. 20 and thus hold the lever arms 243 in an upper or lower position as desired by the two sets of holes 246. The arms 243 are normally set to spring the cone shaped pins 245 into engagement with the holes 246 and hold them there in either position as the operator desires. The arm 240 at the right side of the impression carriage is provided with a bell crank arm 247 Fig. 20, and in the end of this arm 247 there is a pin 248 which is hinged to a lever 249 having a pin 250 extending thru a slot 251 see Fig. 20 in the frame member 170.

The pin 250 extends thru to the inside of the frame member 170 and passes thru a slot 252 in a horizontal cam bar 253, Figs. 22, 23, 24, and 25, and this cam bar 253 is adapted to move horizontally back and forth by means of pins 254 fixed in the frame member 170 and passing thru a slot 255 in the cam bar 253. The arm 219 has an extension 256 in which there is a pin 257 which engages the slot 258 in the cam bar 253 and the length and position of this slot 258 is such that the cam bar 253 is moved at intervals at the forward and back limits of travel of pin 257 in slot 258 as may readily be observed from the position shown in Figs. 22 and 23. In Figs. 20 and 22 the pin 250 is at the bottom of the slot 251 in the frame member 170 and this has acted upon the arms 240 to hold the marginless margin bar 215 back in a position shown in Figs. 21 and 22. When the pin 250 is moved by the cam slot 252 to the position shown in Fig. 23 the marginless margin bar is in the position to register the paper 176 to be put down upon the hectograph sheet at the location shown in Fig. 22. In the movement of the roller 169 from the position of Fig. 23 to the position of Fig. 22, the roller 169 comes in contact with the paper and the paper likewise comes in contact with the clamping roller 259 and before the paper is brought in contact with the hectograph sheet 149 as the roller 169 comes down into the region of the marginless margin bar 215 the pin 257 contacts against the left end of the slot 258 in the cam bar 253 and thus actuates the cam slot 252 to move the pin 250 downwardly and thus rock the marginless margin bar 215 out of the path of the roller 169 carrying the marginless margin bar from the position of Fig. 23 to the position of Fig. 22 and on the reverse movement of the cam bar 253 the marginless margin bar 215 is brought into registering position again which position is shown in Fig. 23. In order to disconnect the marginless margin bar and to hold it out of service and in idle position to permit the use of the general margin bar 210 I provide means for releasing the pin 257 from the slot 258 and this releasing mechanism is shown in detail in Figs. 18 and 19 wherein 260 indicates the main body of the pin 257 and 261 the milled head of this body which head is adapted to be turned by the fingers of the operator for the purpose of releasing the pin 257 from the slot 258 of the cam bar 253 and this is brought about by the means of a cam slot 262 in the body 260 and this cam slot is engaged by a little pin 263 screwed into the portion 256 of the arm 219 see Figs. 18 and 19. Thus when it is desired to hold the marginless margin bar out of service and out of the way which position is shown in Figs. 24 and 25 the operator simply turns the head 261 of the pin 257 and thus releases the pin from the slot 258 and allows the cam bar 253 to remain stationary and not move when the rocker shaft is moved to rock the arm 219. This releasing of the pin 257 is always made when the cam bar 253 is in the position shown by Fig. 24 which holds the marginless margin bar always free for the use of the general margin bar 210 or for the operator to fix the margin by hand as desired. The clamping roller 259 is provided with journals 264 mounted to revolve in arms 265 hinged on screw pins 266 in the frame members 170 and 171. Projections 267 are provided at the lower ends of these arms and are engaged by the studs 268 over which are threaded springs 269 which abut against blocks 270 fixed in the frame members 170 and 171 and the ends of the studs 268 are secured by collars 271. The function of the springs 269 being to force the clamping roller 259 to clamp the paper to the impression roller 169 in the positions shown in Figs. 22 and 24, the collar 271 limiting the movement of the clamping roller 259 to the position indicated in the Fig. 23.

The rocker shaft 191 is provided with an operating handle 272 see Figs. 15 and 20. This handle is provided with a hand shield 273 and the handle is secured to the shaft 191 by the clamping bolt 274 holding the clamping block 275 to the main portion 276 of the handle.

To hold the handle firmly to revolve the shaft 191 in addition to the clamping bolt 274 I provide a pin 277 which passes thru the shaft 191 and thus insures that the handle 272 will always move in the rocker shaft 191 as desired under the influence of the operator's hand.

After the paper has been pressed down upon the hectograph sheet the carriage is then moved forward by the forward push of the hand of the operator on the handle 272. Then on the return stroke in order to insure against the rocker shaft 191 being revolved backward to release the impression roller 169 from the paper before the carriage has arrived back to contact with the stop blocks 202 I provide a locking latch 278 Figs. 15, 21, and 26 hinged at 279 in the frame member 171 and this latch is provided with a notch 280 adapted to engage a pin 281 in the arm 220 whenever the impression carriage is moved away from the stop blocks 202 since the downward projection 282 of the latch 278 is provided to extend down to be engaged by the face 208 of the block 202 as shown in Fig. 21 and thus to lift the notch 280 clear of the pin 287 whenever the carriage is back to contact with the blocks 202 but when the carriage moves forward in the work of impressing the paper onto the platen, the latch 278 automatically drops down the notch 280 to engage the pin 281 and thus hold the impression roller down until a complete revolution out and back movement in laying down and taking up the copy as desired.

For the purpose of adjusting the paper copy sidewise across the impression carriage I provide a side guide piece in the form of a plate 283 see Fig. 15 having a side lip or flange 284 and a downward projecting flange 285, to which there is riveted a plate 286, Fig. 22, by the rivets 287, Fig. 24, thru which there passes a locking stud 288 having a head 289 which clamps the plate 290 onto a turned over flange 291 of the cross frame member plate 172 thru the medium of a small lever 292 hinged at 293 to the said stud 288 having a head 289 which clamps the plate 290 onto a turned over flange 291 of the cross frame member plate 172 thru the medium of a small lever 292 hinged at 293 to the said stud 288 and the lever 292 is provided with the cam surface 294 adapted to clamp the plates 286 and 290 to the flange 291 of frame member 172. Thus when the lever 292 is in position shown in Figs. 22 and 23, 24 and 25, the side paper guide is held in a fixed position. This may be quickly adjusted to be moved either way by lifting the lever 292 and thus free the clamping of the flange 291 and allow the side paper guide to be adjusted by hand crosswise as may be desired.

The applicant has disclosed novel features in this application which are also disclosed in his co-pending applications Ser. Nos. 14,840; 26,777; 18,326; and 54,750 and expressly reserves the right to claim any novelty not covered by the claims of this application as allowed in another co-pending application.

What I claim is:

1. In a machine of the class described a series of spools adapted to carry on their spindles a hectograph sheet and a chuteway provided with suitable tracks adapted to hold the supply of said spools and adapted to have them roll downward to a lowermost position in the chuteway, a secondary chuteway vertically arranged and adapted to guide the said spools in an upward travel through this secondary chuteway, mechanism adapted to take spools consecutively from the lower region of the first mentioned chuteway and lift them up by a step by step motion to an upward topmost position of service.

2. In a machine of the class described, an impression bed adapted to hold and carry a hectograph sheet in hectograph copy work, means for holding the hectograph spools at each end of the said bed and a chuteway extending from one end of said bed along underneath the said bed to the other end of the said bed in combination with a chuteway underneath this first mentioned chuteway and adapted to carry surplus hectograph spools forward and downward as a magazine supply for spools and a vertically arranged chuteway adapted to guide the hectograph spools from the lower end of the said magazine chuteway upward to a position at one end of the impression bed.

3. In a machine of the class described, an impression bed, mechanisms for holding and supporting hectograph spools at each end of the bed in combination with a series of chuteways through which the said hectograph spools are adapted to travel, one of the said chuteways extending from end to end of the bed and underneath thereof and another chuteway forming an S-shaped magazine adapted to carry hectograph spools forward and downward to a lower position near the base of the machine, and a vertically arranged chuteway adapted to guide hectograph spools in a travel from the S-shaped magazine chuteway up to the entrance of the first mentioned chuteway at one end of the said bed and means for carrying step by step a series of spools from the bottom of the vertically arranged chuteway upward to the first mentioned chuteway underneath the bed.

4. In a machine of the class described, a series of spools adapted to carry thereon hectograph copying sheets, flanges on the ends of the said spools slightly larger than the mass of hectograph sheet wound on the spindle of the said spools, an impression bed over which the hectograph sheet is adapted to be trained in the service of copying, a magazine chuteway located underneath the said platen bed and provided with suitable trackways down which the said magazine spools are adapted to roll under the influence of gravity, a vertically arranged chuteway connecting from the bottom of the said magazine chuteway and extending upward to one end of the said impression bed, a series of push pawls mounted upon vertical reciprocating bars and adapted to push upward through the said vertically arranged chuteway a series of said hectograph spools, a series of detent pawls arranged to prevent the backward return of the said spools in the said vertically arranged chuteway, a rocking lever adapted to move upward and downward the said vertically arranged reciprocating bars which carry the said push pawls.

5. In a machine of the class described, a series of hectograph spools and a vertically arranged chuteway adapted to guide the hectograph spools upward through the chuteway, reciprocating means adapted to carry the said spools step by step upward through the said chuteway.

6. In a machine of the class described, a vertically arranged chuteway adapted to guide a series of hectograph spools in upward travel, a reciprocating mechanism adapted to engage a series of spools simultaneously and move them upward in the said vertical chuteway, a series of detents adapted to hold the said spools from falling backward in the said vertically arranged chuteway.

7. In a machine of the class described, a vertical chuteway adapted to guide upwardly a series of hectograph spools, a series of push pawls adapted to push the spools up the said chuteway by contact on the end flanges of the said spools and a series of detent pawls adapted to contact with the said spools at the central portions of the ends thereof and retain the same from descending down the chuteway.

8. In a machine of the class described, an impression bed, a hectograph sheet mounted on spools one at each end of the impression bed and means for winding the sheet over the impression bed from one spool to the other, a moistening device located adjacent to one of the said hectograph spools and consisting of a box containing moistening fluid and a roller mounted in the box and a secondary roller mounted upon arms hinged to swing upward and to and fro toward the hectograph sheet wound upon one of the spools, moistening belts trained over the roller in the box and over the said secondary roller and adapted to contact and impart moisture to the said hectograph sheet as the same is wound or unwound upon the spool adjacent to the moistening device and said secondary roller adapted to swing outward and away and clear of the said hectograph sheet.

9. In a device of the class described, a moistening device consisting of a water box having mounted therein a roller adapted to revolve partly submerged in the water in the box, arms extending upward from the box and a secondary roller adapted to revolve in the ends of the arms, moistening belts trained over the first mentioned roller and over the secondary roller and adapted to carry moisture upward and forward out of the box and contact with the hectograph sheet as the same is carried upon a spindle in the machine.

10. In a machine of the class described, a moistening device consisting of a box adapted to carry water, a roller mounted to revolve partly submerged in the water in the box, flanges at each end of the said roller and at intermediate points for the purpose of guiding moisture carrying belts, a secondary roller hinged to swing about a radius having the axis of the first mentioned roller as a center and in a position upward and out of the said waterbox and adapted to swing to and fro in a region over the top of the box, a series of moistening belts trained between the flanges on the first mentioned roller in the waterbox and over the secondary roller and adapted to carry moisture up out of the box and apply it to a gelatin pad sheet mounted upon a spindle within the range of swing of the secondary roller.

11. In a machine of the class described, a moistening device adapted to carry moisture out of a box upwardly and outwardly onto a gelatin pad sheet through the medium of a series of belts trained over a roller within a waterbox and over a swinging roller adapted to rest by gravity upon the gelatin pad sheet and the said belts adapted to be moved by frictional contact with the gelatin pad sheet as the same is wound and unwound to and from a carrying spindle for the gelatin pad sheet.

12. In a machine of the class described, an impression bed, spindle carrying means located at each end of the bed, a trackway having a track on each side of the impression bed, gear racks located outside of the trackway on each side thereof and spaced apart from the trackway leaving slots between the racks and the trackways, an impression carriage mounted upon wheels and adapted to roll backward and forward on the said trackway, a shaft extending across the carriage and provided with gear wheels adapted to mesh into the said racks, said wheels running idly on the said shaft and said gears fixed to the said shaft and thus adapted to cause the carriage to travel evenly backward and forward under the influence of the said racks, projections on each end of the said carriage extending downward below the trackway thru the said slots and adapted to assist in preventing accidental displacement of the said carriage on the said trackway.

13. In a machine of the class described, an impression bed, a trackway on each edge of the said bed, gear racks located alongside of the said trackway on each side of the bed, an impression carriage provided with wheels at one end of the carriage adapted to roll on the said trackway and said wheels loosely mounted upon a shaft which extends across and above the impression bed, gear wheels fixed to the said shaft and revolving therewith and adapted to engage the gear racks on each side of the impression bed, a secondary set of wheels mounted in arms at the other end of the said carriage and said arms hinged to the carriage and said wheels also running on the said trackway and said arms adapted to swing about their hinged centers and produce a raising and lowering of one end of the carriage body.

14. In a machine of the class described, an impression bed, gear racks mounted on each edge of the said bed, an impression carriage mounted at one end upon a shaft extending across and over the impression bed, fixed gear wheels on the said shaft and the latter adapted to engage the rack teeth of the said racks, the other end of the said carriage mounted to ride on a secondary set of wheels riding on trackways on each side of the said impression bed, an impression roller mounted in the said carriage and adapted to be raised and lowered in contact with the bed in applying paper thereto.

15. In a machine of the class described, an impression bed having arranged on each side thereof a trackway and a gear rack, an impression carriage adapted to roll over the impression bed and be supported on wheels that ride on the said trackway, a shaft extending across the frame and provided with gears on each end thereof and said gears fixed to the said shaft and adapted to engage the rack teeth and thus hold the impression carriage always in right position in its movement over the impression bed, an impression roller mounted in the carriage in a manner to be raised and lowered in relation to the impression bed, a brake adapted to clamp the impression roller and prevent its movement during a part of its up and down movement in relation to the impression bed and means for releasing the brake as the impression roller contacts with the paper and the bed.

16. In a machine of the class described, an impression bed, an impression carriage mounted to move backward and forward over said impression bed and an impression roller carried by the carriage, means for raising and lowering the impression roller in relation to the impression bed, a brake adapted to prevent the turning of the impression roller on its axis as the same is raised and lowered in relation to the impression bed, a cam movement adapted to control the action of the said brake whereby the brake is in contact with the impression roller at all times save only when it is down in the act of forming the impression.

17. In a machine of the class described, an impression bed, an impression carriage adapted to roll backward and forward over the impression bed and carry an impression roller to apply paper to the bed, said impression roller mounted in arms hinged into the carriage and said arms adapted to raise and lower the said impression roller, a brake adapted to clamp and prevent movement of the impression roller upon its axis and said brake carried by the said arms, a cam track mounted in the frame of the carriage and adapted to control the clamping and release of the said brake as the said impression roller is raised and lowered.

18. In a machine of the class described, an impression bed and an impression carriage adapted to move backward and forward over the bed and an impression roller mounted in the said carriage and adapted to be raised and lowered in relation to the bed, a marginless margin bar carried by the carriage and adapted to register paper in positioning the same in the carriage and in relation to the bed, said margin bar carried by arms hinged to a secondary set of arms and the said secondary arms fixed upon a cross rocker shaft and adapted to raise and lower the hinged centers which support the arms that carry the margin bar and thus by the movement of the secondary arms the body of the margin bar is raised and lowered into and out of service position in relation to the said impression roller, a cam track adapted to be moved simultaneously with the raising and lowering of the said impression roller in relation to the carriage and said cam track connected to a bell crank arm connected to the arms which support the said marginless margin bar and the said cam track adapted to bring about a forward and backward movement of the said margin bar in relation to the impression roller position as the said impression roller is raised and lowered in the service of impressing the paper onto the impression bed.

19. In a machine of the class described, the combination with an impression bed, of an impression carriage adapted to move backward and forward over the bed, an impression roller mounted in the said carriage and adapted to be raised and lowered in relation to the bed, a margin bar carried by the said carriage, means for moving said bar clear of said impression bed during a reciprocation of the carriage and means for at will rendering said bar inoperative.

20. In a machine of the class described, an impression bed and an impression carriage mounted to travel backward and forward over the bed, an impression roll carried by the carriage and a marginless margin bar mounted on said carriage, means for moving said bar into and out of operative position at the beginning of each printing operation, and means for at will rendering said bar inoperative.

21. In a machine of the class described, an impression bed, and an impression carriage arranged to travel backward and forward over the bed, a marginless margin bar carried by the carriage and adapted to be raised and lowered into and out of service position in the carriage, an ordinary margin bar fixed in the frame of the machine and at one end of the impression bed.

22. In a machine of the class described, an impression bed, an impression carriage mounted to travel backward and forward over the bed, an impression roller mounted in the carriage and adapted to be lowered and raised to and from the said bed and a marginless margin bar carried at all times by the carriage and mounted to be raised and lowered out of service position in the carriage, an ordinary margin bar fixed in the frame of the machine in relation to one end of the impression bed, stop blocks for the carriage adapted to arrest the movement of the carriage in position in relation to the ordinary margin bar and to be adjusted lengthwise of the impression bed in order to accommodate for the services with either margin bar.

23. In a machine of the class described, an impression bed, an impression carriage adapted to be moved backward and forward over the bed, a marginless margin bar carried by the carriage and supported on arms hinged in a secondary set of arms and the said secondary set of arms adapted to raise and lower the hinge pins of the arms which support the marginless margin bar, a bell crank arm connected to one of the marginless margin bar supporting arms and a cam bar provided with a cam track and a cam pin connected to the said bell crank arm of the said marginless margin bar whereby on the movement of the said cam track the said marginless margin bar is swung about its hinged centers in a movement to and from a position of registering the paper in relation to the impression roller when the latter is downward in the act of impressing paper to the impression bed.

24. In a machine of the class described, an impression bed, a carriage mounted to travel backward and forward over the bed and carry an impression roll adapted to be moved to and from the impression bed, a marginless margin bar hinged into the frame of the carriage and adapted to be swung backward and forward under the influence of a movable cam track, a movable cam track for the marginless margin bar, means provided for raising and lowering the hinge pin centers of the margin bar itself in relation to its service position in the carriage and means for disconnecting and holding said marginless margin bar in stationary idle position.

25. In a machine of the class described, an impression bed, an impression carriage mounted over the bed and adapted to move to and fro over the bed, an impression roller carried by the impression carriage adapted to be moved to and from the impression bed, a marginless margin bar hinged in the carriage, a cam operated means for moving said bar and means for at will raising and rendering inoperative said bar.

26. In a machine of the class described, an impression bed, an impression carriage mounted to move to and fro over the bed, an impression roll carried by the carriage and adapted to be moved to and from the impression bed, a marginless margin bar hinged in the carriage and adapted to be swung to and fro in registering and releasing the paper for contact with the impression bed in combination with means for disengaging the movement of the said marginless margin bar from its to and fro movement and for holding the same in a neutral idle and out of service position.

27. In a machine of the class described, an impression bed, an impression carriage mounted to travel to and fro over the bed, an impression roll carried by the carriage and adapted to be moved to and from the impression bed, a marginless margin bar supported on arms hinged into a secondary set of arms and said secondary set of arms fixed to a shaft which extends across the machine and means for raising and lowering the secondary set of arms and therewith the hinged centers of the said marginless margin bar and means for locking the said secondary set of arms in the raised and lowered positions.

28. In a machine of the class described, an impression carriage carrying an impression roller adapted to be raised and lowered in the carriage, a marginless margin bar carried by the carriage and adapted to be swung to and fro in the service of registering the paper in relation to the clamping position of the impression roll, a cam movement for controlling the to and fro movement of the marginless margin bar and means for disengaging the connection of the cam movement with the marginless margin bar, and means for raising and lowering the marginless margin bar out of and into service positions.

29. In a machine of the class described, an impression carriage carrying an impression roll adapted to be raised and lowered in the carriage, a marginless margin bar carried by the carriage and adapted to be swung to and fro in the service of registering the paper in relation to the movement of the impression roll, a cam movement adapted to control the movement of the marginless margin bar, a brake adapted to clamp and prevent rotation of the impression roll during a part of its movement in the act of clamping the paper in the impression carriage, a cam movement for controlling the action of this brake in a manner to hold the impression roll against rotation at all times save only when an impression is being made by the impression roller.

30. In a machine of the class described, an impression carriage supported on one end by a cross shaft mounted in bearings in the impression carriage and supported at the other end by a secondary cross shaft connected to the carriage by means of arms hinged to the said carriage and journaled onto the said secondary shaft, wheels mounted on each shaft and adapted to support the impression carriage in rolling contact in relation to an impression bed, an impression bed over which the said carriage is adapted to be supported and moved to and fro over the said impression bed, the arms supporting the said secondary shaft adapted to swing about their hinge pin centers and permit the secondary shaft with its wheels to hold up one end of the carriage for clearance underneath the carriage between it and the impression bed.

31. In a machine of the class described, an impression carriage and an impression bed and the said impression bed provided with trackways and the said impression carriage provided with wheels adapted to roll on the said trackways, one set of wheels mounted loosely upon a cross shaft journaled in one end of the frame of the impression carriage, gear racks mounted on each side of the said impression bed and gear wheels fixed to the said cross shaft and adapted to engage the said gear racks and thus maintain always the said shaft squarely across the said impression bed, adjustable bearings in the frame of the said impression carriage adapted to provide a close adjustment of the said shaft as relates to the impression carriage in order to provide an exact adjustment in the square position of the carriage in relation to the impression bed.

32. In a machine of the class described, an impression bed provided with trackways on each edge thereof, gear racks on each side of the said impression bed, an impression carriage provided with wheels adapted to roll on the said trackways, gear wheels fixed to the said cross shaft and adapted to engage the said gear racks, stop blocks for stopping the movement of the carriage in determined positions in relation to the impression bed, and said blocks secured to and adjustable along the said gear racks.

33. In a machine of the class described, an impression bed and an impression carriage adapted to move backward and forward over the bed, said impression carriage having an inclined cross frame member adapted to act as a paper guide in combination with end plate members and provided with a rocker shaft having arms adapted to support an impression roller, an impression roller mounted in the said arms, a brake member adapted to contact with the said impression roller and to prevent its movement about its axis, a cam movement for controlling the action of the brake member and adapted to be actuated by the movement of the rocker shaft which supports the impression roller, said cam movement arranged to hold the roller from its movement about its axis save only when the impression is being made on the impression bed.

34. A duplicating machine comprising a bed plate, a reel disposed at one end of said bed plate, a conveyor carrying a plurality of rolls of gelatin band, means for operating said conveyor to bring said rolls consecutively into position in relation to said bed plate, so that said band may be unwound from said roll, stretched over said bed plate and fastened to said reel, said rolls being adapted to be unwound entirely and free from their corresponding spindles and wound upon fresh spindles.

35. A duplicating machine comprising a bed plate, a reel disposed at one end of said bed plate, a conveyor carrying a plurality of rolls of gelatin band, means for operating said conveyor to bring said rolls consecutively into position in relation to said bed plate, so that said band may be unwound from said roll, stretched over said bed plate and fastened to said reel, and means for winding said reel to unwind said band from said roll, and for rewinding said band after it has been wound upon said reel, said rolls being adapted to be unwound entirely and free from their corresponding spindles and wound upon fresh spindles.

36. A duplicating machine comprising a frame, a bed on the frame, a conveyor on said frame below the bed, a plurality of gelatine band rolls carried by said conveyor, and means on said frame to operate said conveyor, said means for operating said conveyor consisting of reciprocating members adapted to lift said rolls in a step by step movement in said conveyor.

37. A duplicating machine comprising a frame, a conveyor mounted on said frame and carrying a plurality of rolls, a bed plate, means for bringing a roll on said conveyor into position adjacent one end of said bed plate, a reel disposed adjacent the other end of said bed plate, means for winding the material on said roll onto said reel, said roll rotating freely during said winding operation and said reel being positively rotated, and means for rewinding the material from said reel onto said roll, said reel rotating freely during said rewinding operation and said roll being positively rotated, said rolls being adapted to be unwound entirely and free from their corresponding spindles and wound upon fresh spindles.

38. A hectograph duplicating machine comprising a main frame, a bed plate on the frame, a gelatin band on the bed plate, a carriage movable over said bed plate and band, a platen on the carriage and movable into and out of operative relation to the bed plate, a margin bar pivoted on the carriage and adapted to receive the edge of a sheet of paper when the platen is out of operative relation to the bed plate, and a cam connection between the platen and the margin bar to disengage the margin bar from the paper when the platen engages the paper to press it upon the band, said cam connection consisting of a horizontally movable bar having an inclined cam slot connected by a link motion to rocker shaft arms hinged to control the movement of said margin bar.

39. In a duplicating machine a conveyor, a plurality of rolls of gelatin band thereon, means for operating said conveyor to bring said rolls consecutively into position for use, and means for preventing unwinding of the rolls not in use, said rolls being adapted to be unwound entirely and free from their corresponding spindles and wound upon fresh spindles.

40. A duplicating machine comprising a plurality of rolls of gelatin bands mounted thereon, each of said bands being mounted on a spindle conveying means for moving said rolls successively into operative position, and means to unwind each of said rolls when in said operative position, said rolls being adapted to be unwound entirely and free from their corresponding spindles and wound upon fresh spindles.

41. A duplicating machine, comprising a plurality of rolls of gelatin bands mounted thereon each of said bands being mounted on a spindle, conveying means for moving said rolls successively into operative position, means to unwind each of said rolls when in said operative position, and means to rewind said roll after it has been unwound, said rolls being adapted to be unwound entirely and free from their corresponding spindles and wound upon fresh spindles.

42. A hectograph duplicating machine comprising a carriage, a platen pivotally mounted on said carriage, a margin bar pivotally mounted on said carriage, and a cam slot and pin connection between said platen and said margin bar causing movement of said margin bar when said platen is raised, said cam slots being located in a horizontally disposed bar adapted to be moved horizontally in the control of the engagement of said pin by said slot and said horizontally disposed bar adapted to be moved intermittently in relation to its connection with said platen.

43. A hectograph duplicating machine comprising a carriage, a platen pivotally mounted on said carriage, a margin bar pivotally mounted on said carriage, and a cam slot and pin connection between said platen and said margin bar causing movement of said margin bar when said platen is either raised or lowered, said cam slots being located in a horizontally disposed bar adapted to be moved horizontally in the control of the engagement of said pin by said slot and said horizontally disposed bar adapted to be moved intermittently in relation to its connection with said platen.

44. A hectograph duplicating machine comprising a platen adapted to operate on a sheet of paper, a margin bar to receive the edge of said sheet of paper, and means to move said margin bar into and out of position to so engage a sheet of paper, and a cam slot and pin connection between said platen and said margin bar controlling said movement through movement of said platen, said cam slots being located in a horizontally disposed bar adapted to be moved horizontally in the control of the engagement of said pin by said slot and said horizontally disposed bar adapted to be moved intermittently in relation to its connection with said platen.

45. A hectograph duplicating machine comprising a platen carriage, a platen pivotally mounted on said carriage, a margin bar pivotally mounted on said carriage, and a pin and cam slot connection between said platen and said margin bar to cause movement of said margin bar to be controlled by movement of said platen, said cam slots being located in a horizontally disposed bar adapted to be moved horizontally in the control of the engagement of said pin by said slot and said horizontally disposed bar adapted to be moved intermittently in relation to its connection with said platen.

Signed at Chicago, in the county of Cook and State of Illinois, this 20th day of April, 1926.

WILLIAM ERASTUS WILLIAMS.